United States Patent
Yeh et al.

(10) Patent No.: US 8,368,991 B2
(45) Date of Patent: Feb. 5, 2013

(54) 3D IMAGE DISPLAY DEVICE AND ELECTROCHROMIC MODULE THEREOF

(75) Inventors: Yu-Chou Yeh, Taoyuan County (TW);
Chao-Yi Wang, Taoyuan County (TW);
Wen-Chih Lo, Taoyuan County (TW);
Chi-Hsien Sung, Taoyuan County (TW);
Tsung-Her Yeh, Taipei County (TW)

(73) Assignee: J Touch Corporation, Taoyuan County (TW)

( * ) Notice: Subject to any disclaimer, the term of this patent is extended or adjusted under 35 U.S.C. 154(b) by 79 days.

(21) Appl. No.: 13/110,028

(22) Filed: May 18, 2011

(65) Prior Publication Data
US 2012/0154891 A1    Jun. 21, 2012

(30) Foreign Application Priority Data
Dec. 21, 2010 (TW) .............................. 99144944 A

(51) Int. Cl.
*G02F 1/15* (2006.01)
(52) U.S. Cl. ....................................... 359/265
(58) Field of Classification Search .................. 359/254, 359/265, 274, 464, 462; 348/51; 345/49
See application file for complete search history.

(56) References Cited

U.S. PATENT DOCUMENTS
8,115,985 B2 * 2/2012 Liu ................................ 359/273
2006/0087499 A1 4/2006 Chen et al.

FOREIGN PATENT DOCUMENTS
TW            371902 M      4/2009
TW            368088 M     11/2009

* cited by examiner

*Primary Examiner* — Joseph Martinez
(74) *Attorney, Agent, or Firm* — Rosenberg, Klein & Lee

(57) ABSTRACT

A 3D image display device includes a display module, an electrochromic module, a control unit and a sensing unit. The electrochromic module has a first electrochromic element and a second electrochromic element disposed in the different direction, and the electrochromic element is a solution type electrochromic material, and the valence of ions in the material is changed to produce a quick and uniform coloration. The display device transmits a detect signal of the sensing unit to the control unit, and the control unit controls the coloration/decoloration of the first and second electrochromic elements to switch the horizontal or vertical parallax barrier, such that viewers can view a 3D image from different viewing angles and directions.

53 Claims, 31 Drawing Sheets

3D IMAGE DISPLAY DEVICE AND ELECTROCHROMIC MODULE THEREOF

CROSS-REFERENCE TO RELATED APPLICATIONS

This non-provisional application claims priority under 35 U.S.C. §119(a) on Patent Application No(s). 099144944 filed in Taiwan, R.O.C. on Dec. 21, 2010, the entire contents of which are hereby incorporated by reference.

BACKGROUND OF THE INVENTION

1. Field of the Invention

The present invention relates to the field of image display devices and electrochromic modules thereof, and more particularly to a 3D image display device and an electrochromic module thereof capable of changing direction and displaying 3D images.

2. Description of the Related Art

At present, 3D images are mainly divided into two types, respectively: 3D images viewed by naked eyes and viewed by wearing shutter glasses.

With reference to FIGS. 1 and 2 for schematic views of a 3D image display device that generates 3D images by shutter glasses in accordance with a prior art and its synchronous control process respectively, after a light produced by a backlight device 13 is passed through an LCD panel 12 in the conventional 3D image display device 1, a viewer's left and right eyes see left-eye image information and right-eye image information at different time points respectively to produce a visual separation effect, and the alternately displayed left and right-eye image information are operated synchronously by shutter glasses 11 and a control circuit (not shown in the figure), wherein a switch signal is provided for controlling the ON and OFF of the left and right eyes of the shutter glasses 11. After the switch process and the receipt of images by the LCD panel 12 are synchronized to display the left-eye image information, the shutter will block the vision of the right eye. On the other hand, when the right-eye image information is displayed, the shutter will block the vision of the left eye. Therefore, the left-eye and right-eye images are displayed alternately, and a 3D visual effect can be produced by the visual retention effect. This method of forming 3D images is called "Time Division".

In addition, there is a method called Wavelength Division, wherein red or green colored glasses is worn to view left-eye and right-eye images, and the viewer's left eye can see a red vision image only and the viewer's right eye can see green vision image, and the left and right images of different colors are processed to form a 3D image.

In addition, there is a 3D image display device manufacturing based on the Pulfrich effect, and the 3D image display device comprises a pair of Pulfrich 3D glasses, and one lens of the 3D glasses further comprises a neutral filter, such that the different transmittance of the left and right lenses can produce a visual illusion, since the viewer's brain senses the stimulation of a dark object slightly slower that the stimulation of a bright object. Although both eyes can see the same image, the speed of transmitting images to the viewer's brain is slower through the filter, so that a virtual spatial depth is created to produce a 3D effect.

In the aforementioned method of viewing 3D images by wearing the glasses, the related technology is matured and used extensively in movie, television and projector industries. However, since the technology requires wearing glasses additional, it causes tremendous inconvenience for viewers already wearing a pair of near-sighted or far-sighted glasses to wear another pair of glasses to view the 3D images. If the 3D glasses are worn in public, three will be a sanitary issue. Furthermore, many viewers may become dizzy and have nausea by wearing glasses of this sort, and thus incurring physiological burdens to wearers, and limiting the application of such 3D image technology.

The naked-eye 3D image display technology is mainly divided into two types: lenticular and barrier, wherein the lenticular includes a plurality of slender rectangular convex lenses arranged along an axis, and the principle of optical refraction is used for generating different left-eye and right-eye images. Compared with the barrier, the lenticular uses the light refraction to achieve the light division effect, so that there is less light loss, and a better brightness, but the refraction effect at the edge of the lenses is very limited, and the refraction effect is very poor. Since it is difficult to control the precision of manufacturing the lenticular lenses, stray lights will be produced easily to affect the overall display effect adversely.

Furthermore, the barrier uses the whole row of barriers to limit the exit light to a specific angle, and only images from a certain angle can be transmitted to the viewer's left and right eyes only to generate the 3D image. Compared with the lenticular lenses, the single-eye image is clearer. However, the overall brightness and resolution of the image will be reduced due to the feature of the structure.

As material technologies advance, electrochromic materials have the coloration or decoloration effect and they are gradually used as the parallax barrier required for displaying naked-eye 3D images. As disclosed in R.O.C.(TW) Pat. No. M368088 entitled "Integrated electrochromic 2D/3D display device, R.O.C.(TW) Pat. No. M371902 entitled "Display device for switching 2D image/3D image display screen", and U.S. Pat. Application No. 2006087499 entitled "Autostereoscopic 3D display device and fabrication method thereof", electrochromic materials are used as a parallax barrier device for displaying 3D images. However, the aforementioned devices have the drawbacks of lacking the necessary electrolyte layer and the required ions supplied to the electrochromic layer, so that the electrochromic element cannot produce a reversible oxidation or reduction to complete the coloration or decoloration. Therefore, the foregoing patents are not feasible in practical applications. In addition, the transparent electrode layer and electrochromic material layer of the parallax barrier device are grid patterned, and whose manufacturing process requires a precise alignment for coating, sluttering or etching each laminated layer, and thus the manufacturing process is very complicated, and the resistance value is increased to retard the response time, and all laminated layers are grid patterned, so that a hollow area is formed between one grid and the other, and the overall penetration, refraction and reflection of the light will be affected adversely. Even for the general 2D display, the video display quality of the display device will be affected to cause problems related to color difference and uneven brightness.

Furthermore, the prior art used for displaying 3D images can display the 3D images in one direction only. As to the portable electronic products such as mobile phones, PDAs, and GPSs, users can only turn them to a specific direction before viewing the 3D images, but they cannot change the angle of displaying the 3D images flexibly. Obviously, the application according to the prior art is very inconvenient.

SUMMARY OF THE INVENTION

In view of the foregoing drawbacks of the conventional 3D image display devices, the inventor of the present invention based on years of experience in the related industry to conduct extensive researches and experiments, and finally designed and developed a novel 3D display module and an electrochromic module thereof in accordance with the present invention to overcome the drawbacks of the prior art.

Therefore, it is a primary objective of the present invention to provide a 3D image display device and an electrochromic module, such that when the display device is turned to a horizontal or vertical direction, viewers can view 3D images from a suitable angle.

To achieve the foregoing objective, the present invention provides an electrochromic module, comprising a first transparent substrate, a first transparent conductive unit, a plurality of first electrochromic elements, a second transparent conductive unit, a second transparent substrate, a third transparent conductive unit, a plurality of second electrochromic elements, a fourth transparent conductive unit and a third transparent substrate. The first transparent conductive unit is disposed on a side of the first transparent substrate. The first electrochromic elements are disposed on a side of the first transparent conductive unit. The second transparent conductive unit is disposed on a side of the first electrochromic elements. The second transparent substrate is disposed on a side of the second transparent conductive unit. The third transparent conductive unit is disposed at the second transparent substrate. The second electrochromic elements is disposed on a side of the third transparent conductive unit, and the second electrochromic elements are arranged orthogonally with respect to the first electrochromic elements. The fourth transparent conductive unit is disposed on a side of the second electrochromic elements. The third transparent substrate is disposed on a side of the fourth transparent conductive unit. Wherein, the first electrochromic elements change the valence of ions of the first electrochromic elements to change colors by the electrons supplied by the first transparent conductive unit or the second transparent conductive unit, and the second electrochromic elements change the valence of ions of the second electrochromic elements to change colors by the electrons provided by the third transparent conductive unit or the fourth transparent conductive unit.

Wherein, the electrochromic module further includes a plurality of first isolating units and a plurality of second isolating units. The first isolating units are arranged with an interval apart from each other and disposed between the first electrochromic elements, and the second isolating units are arranged with an interval apart from each other and disposed between the second electrochromic elements, and the first isolating units and the second isolating units are arranged orthogonally with each other.

In addition to the foregoing structure, the present invention further adopts another method and arranges a plurality of transparent conductive units arranged with an interval apart from each other on a surface of a single substrate, and the transparent conductive units supply positive and negative voltages alternately to provide the electrons required for the coloration of the electrochromic materials.

Wherein, the first electrochromic elements and the second electrochromic elements are solution type electrochromic elements prepared by the following two types of materials.

The first type of materials includes the first electrochromic elements and the second electrochromic elements produced by mixing and dissolving an organic electrochromic material and an inorganic electrochromic material into a solvent.

Wherein, the organic electrochromic material is a redox indicator, a pH indicator or an organic compound.

Wherein, the inorganic electrochromic material is an inorganic derivative such as an oxide, a sulfide, a chloride and a hydroxide of a transition element.

Wherein, the transition element is one selected from the collection of a scandium subgroup (IIIB), a titanium subgroup (IVB), a chromium subgroup (VIB), a manganese subgroup (VIIB), an iron series (VIII), a copper subgroup (IB), a zinc subgroup (IIB) a vanadium subgroup (VB), and a platinum series (VIII), and the inorganic derivative is one selected from the collection of a halogen group (VIIA), an oxygen group (VIA), a nitrogen group (VA), a carbon group (IVA), a boron group (IIIA), an alkali earth metal group (IIA) or an alkali metal group (IA).

Wherein, the solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethylformamide, N-methylpyrrolidone, sulfon, 3-methyl sulfone and their mixtures.

The second type of materials includes the first electrochromic elements and the second electrochromic elements which are composite materials produced by doping an electrochromic material with an electrolytic material.

Wherein, the electrochromic material is a transition metal oxide selected from the collection of an anodic coloration group, a cathodic coloration group and a cathodic/anodic coloration group, or an organic electrochromic material.

Wherein, the electrolytic material is one selected from the collection of lithium perchlorate ($LiClO_4$), potassium hydroxide (KOH), sodium hydroxide (NaOH) and sodium silicate ($Na_2SiO_3$).

To achieve the foregoing objective, the present invention provides a 3D image display device, comprising a display module, an electrochromic module, a control unit and a sensing unit.

The display module generates a left-eye image and a right-eye image. The electrochromic module is made of the same structure and material as described above. The control unit is provided for switching the voltage of the first transparent conductive unit, the second transparent conductive unit, the third transparent conductive unit and the fourth transparent conductive unit. The sensing unit is electrically coupled to the control unit, and the sensing unit is provided for sensing the rotating direction of the 3D image display device, and transmitting a sensing signal to the control unit for the coloration of the first electrochromic elements or the second electrochromic elements to form a parallax barrier.

DETAILED DESCRIPTION OF THE PREFERRED EMBODIMENTS

The technical characteristics and effects of the present invention will be apparent with the detailed description of preferred embodiment together with the illustration of related drawings as follows.

Figure 1:
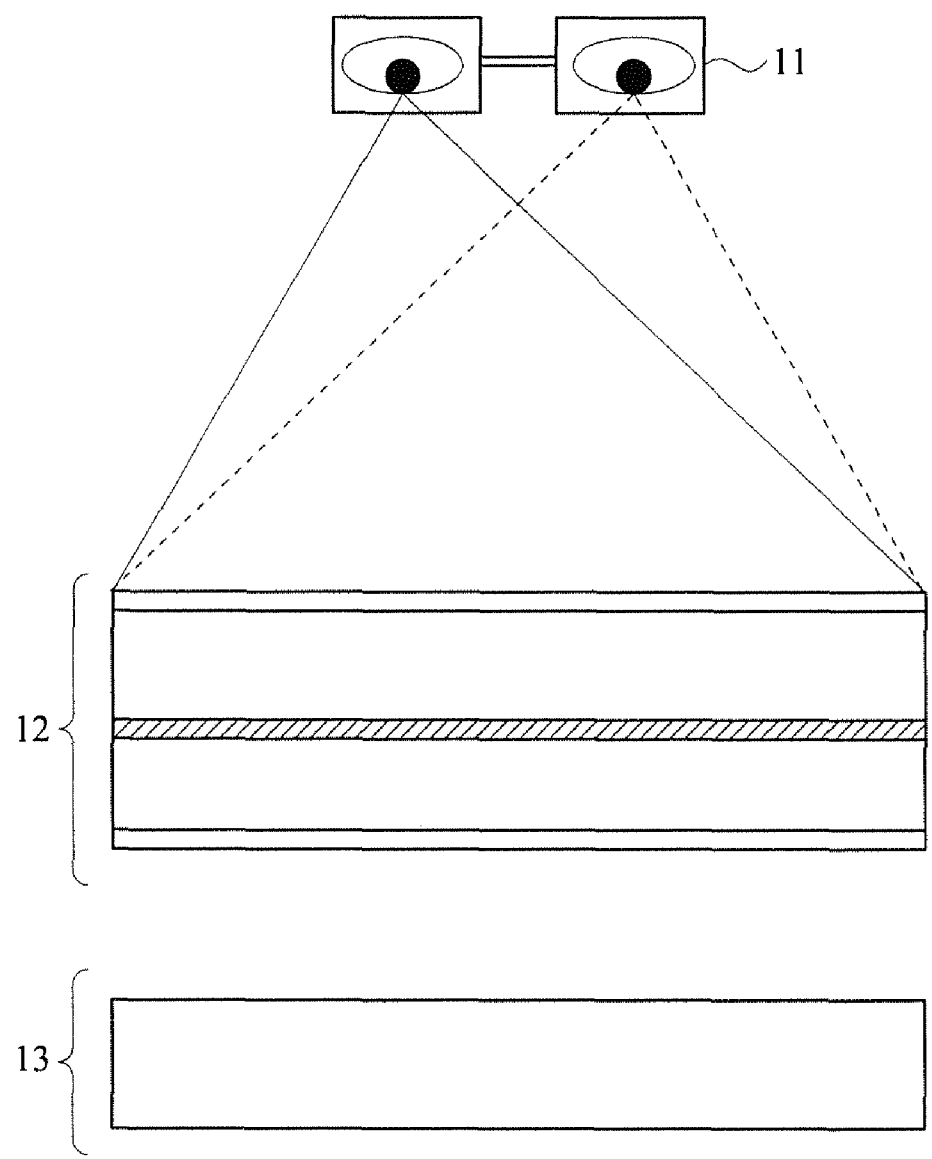
FIG. 1 is a schematic view of using a 3D image display device of a prior art.
Figure 2:
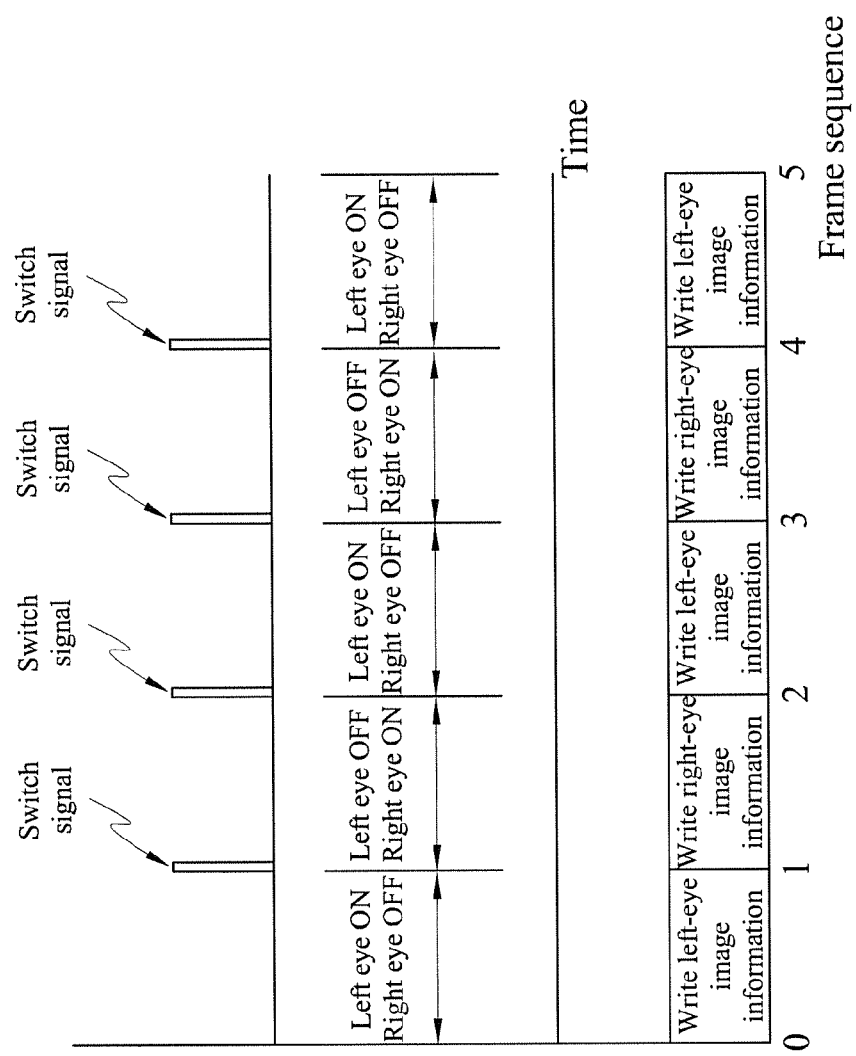
FIG. 2 is a schematic view of a synchronous control process of shutter glasses in accordance with a prior art.
Figure 3:
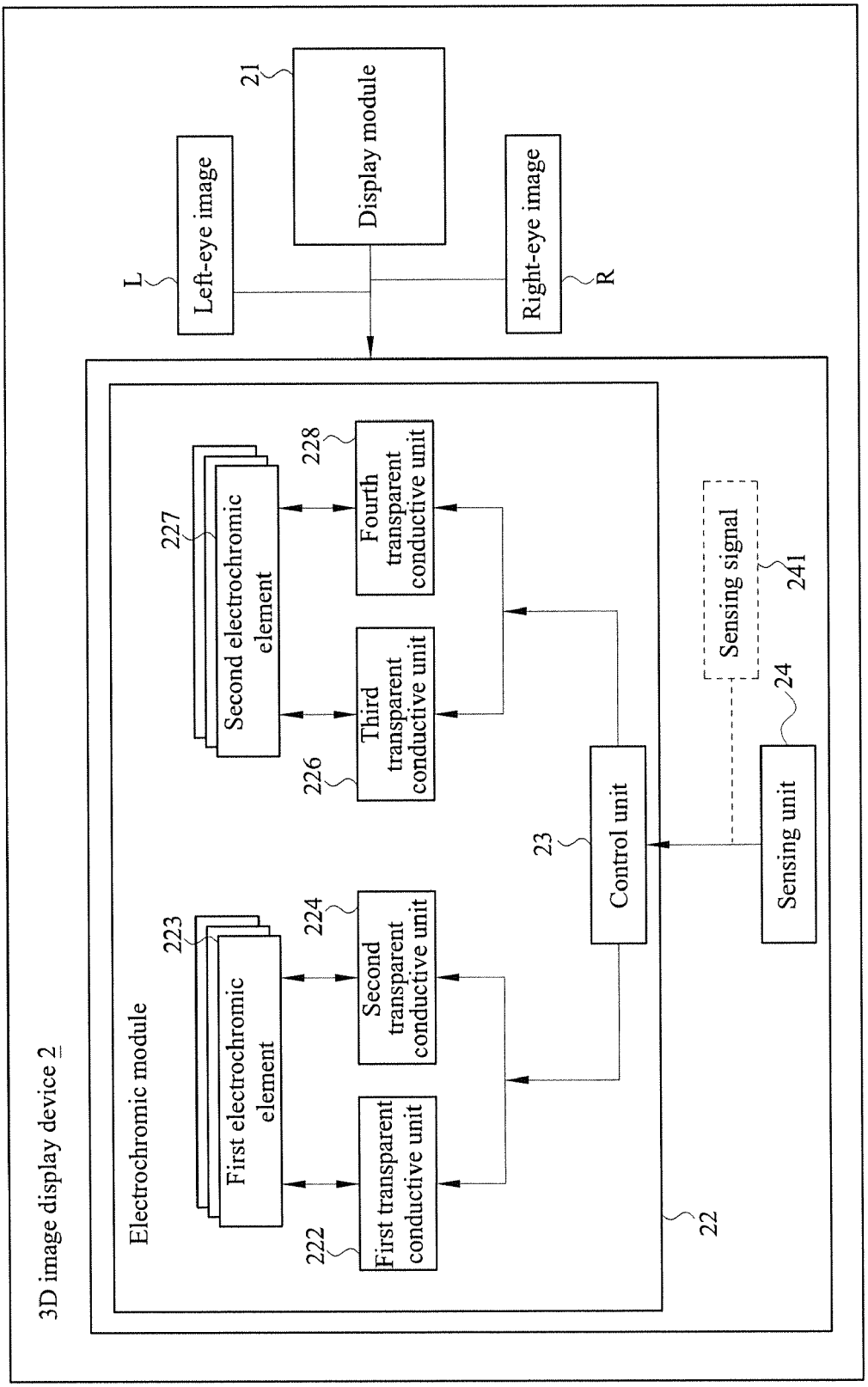
FIG. 3 is a block diagram of a 3D image display device in accordance with a first preferred embodiment of the present invention.
Figure 4:
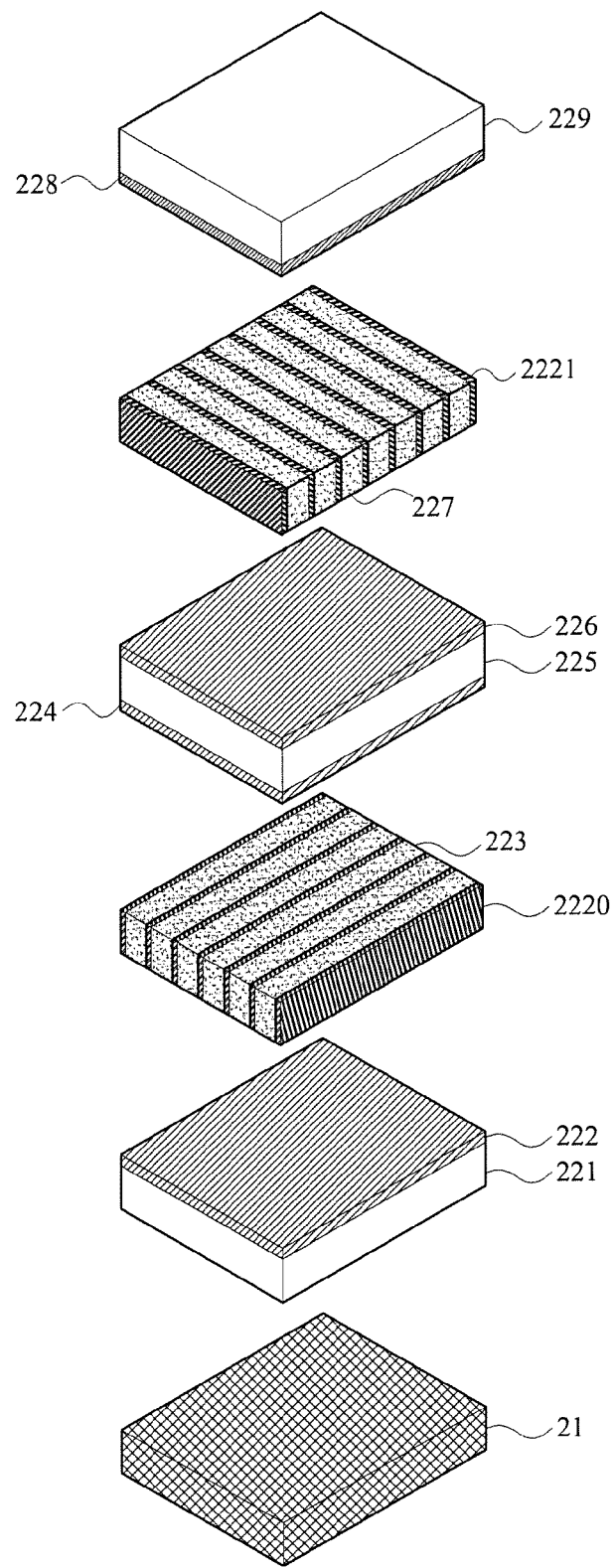
FIG. 4 is an exploded view of an electrochromic module used by the 3D image display device and combined with a display module in accordance with a first preferred embodiment of the present invention.
Figure 5:
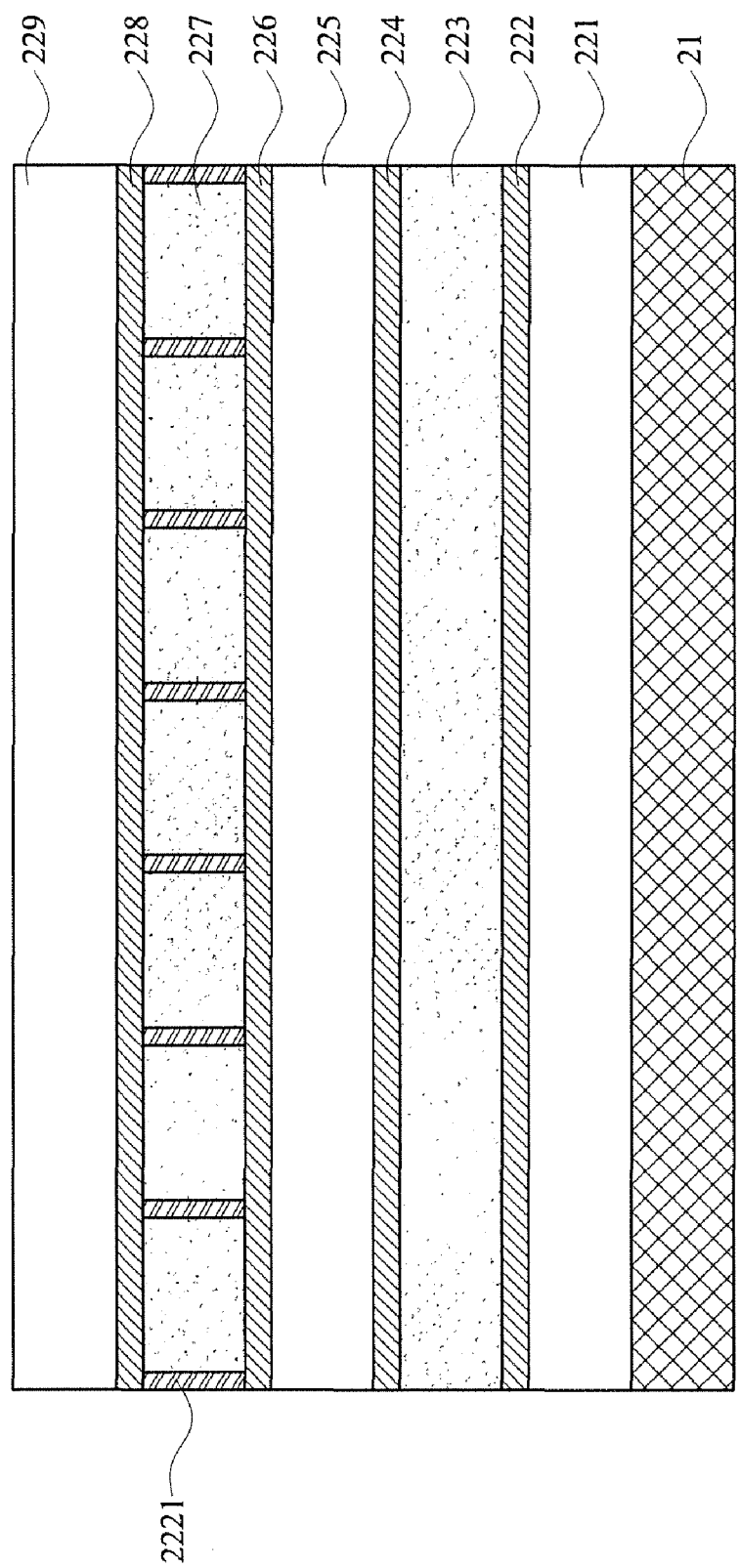
FIG. 5 is a cross-sectional view of an electrochromic module used by the 3D image display device and combined with a display module in accordance with a first preferred embodiment of the present invention.
Figure 6:
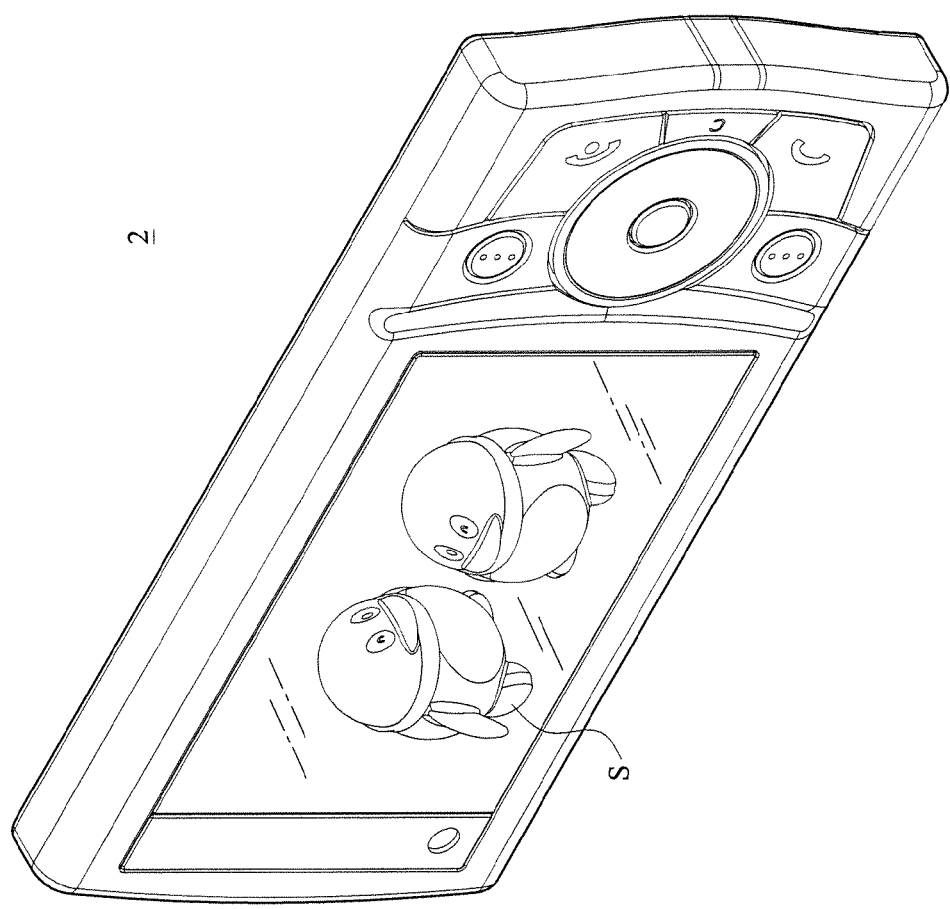
FIG. 6 is a perspective view of a 3D image display device in accordance with a first preferred embodiment of the present invention.
Figure 7:
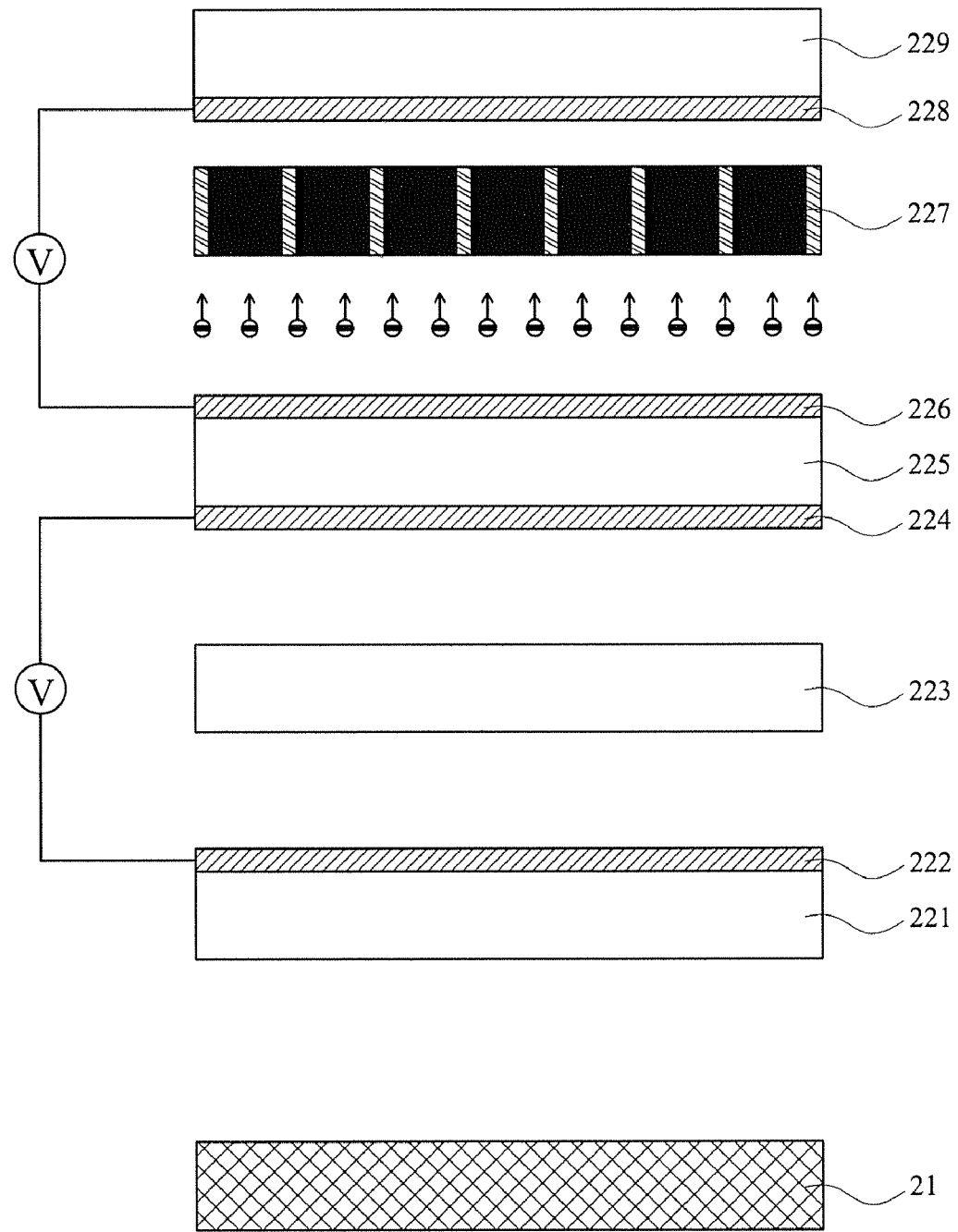
FIG. 7 is a schematic view of a first coloration status of an electrochromic element of a 3D image display device in accordance with the present invention.
Figure 8:
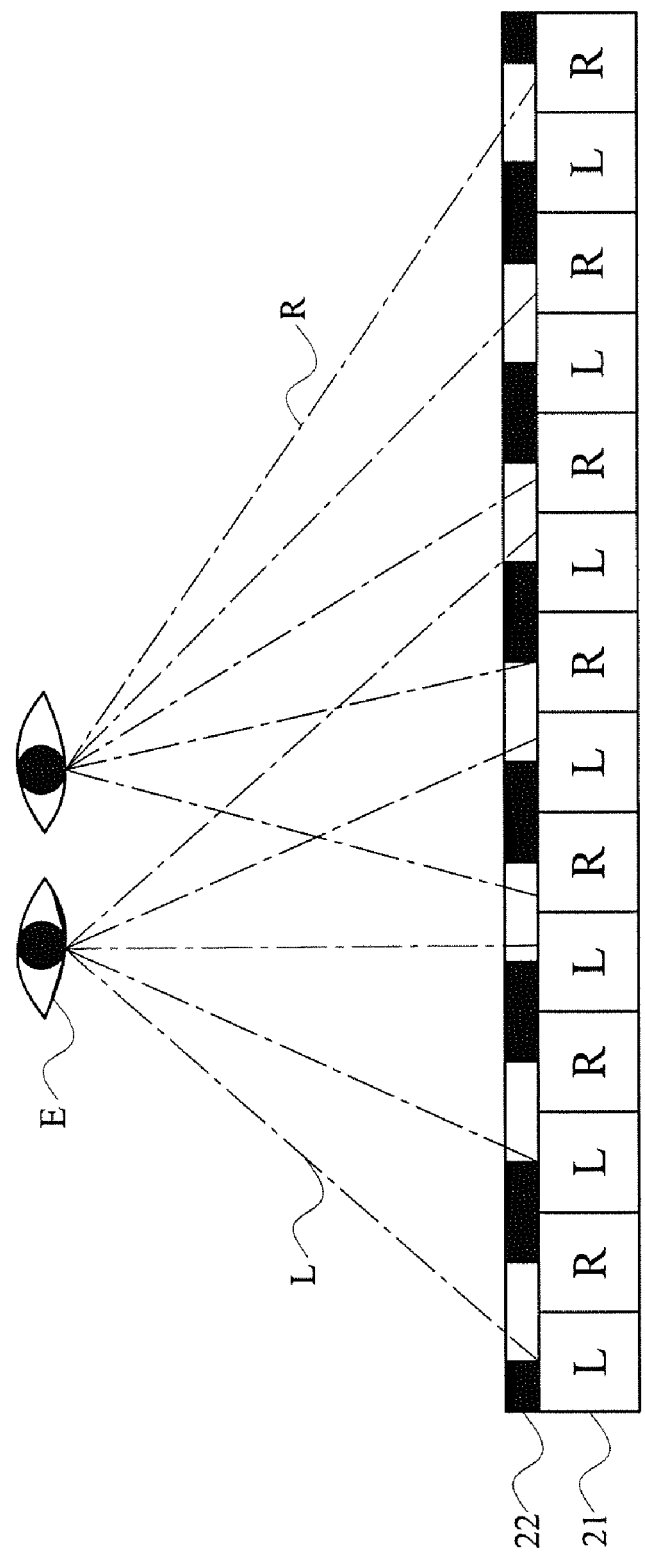
FIG. 8 is a first schematic view of forming a 3D image by a 3D image display device in accordance with a first preferred embodiment of the present invention.
Figure 9:
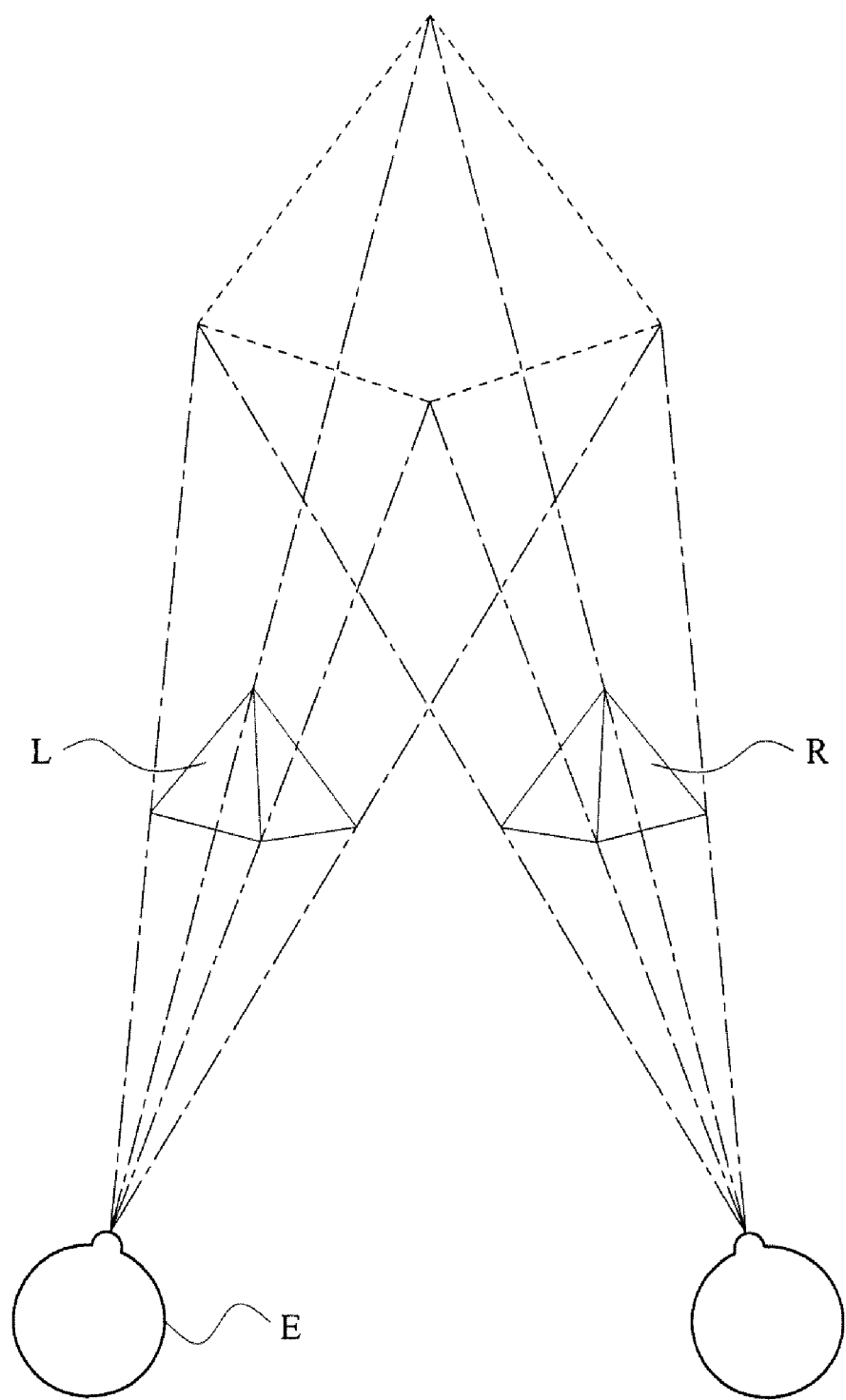
FIG. 9 is a second schematic view of forming a 3D image by a 3D image display device in accordance with a first preferred embodiment of the present invention.

With reference to FIGS. 3 to 5 for a block diagram of a 3D image display device, and an exploded view and a cross-sectional view of an electrochromic module combined with a display module in accordance with a first preferred embodiment of the present invention, the 3D image display device 2 comprises a display module 21, an electrochromic module 22, a control unit 23 and a sensing unit 24.

The display module 21 is provided for generating a left-eye image L and a right-eye image R. The display module 21 can convert a 2D image into an overlapped image containing the left-eye image L and the right-eye image R by software or firmware or directly display signals of an overlapped image formed by the left-eye image L and the right-eye image R. The display module 21 can be a liquid crystal display (LCD), a plasma display panel (PDP), a surface conduction electron-emitter display (SED), a field emission display (FED), a vacuum fluorescent display (VFD), an organic light-emitting diode (OLED) or an E-paper.

The electrochromic module 22 comprises a first transparent substrate 221, a first transparent conductive unit 222, a plurality of first electrochromic elements 223, a second transparent conductive unit 224, a second transparent substrate 225, a third transparent conductive unit 226, a plurality of second electrochromic elements 227, a fourth transparent conductive unit 228, a third transparent substrate 229, a plurality of first isolating units 2220 and a plurality of second isolating units 2221.

The first transparent substrate 221 is disposed on an upper surface of the display module 21. The first transparent conductive unit 222 is disposed at the top of the first transparent substrate 221. Wherein, the first transparent substrate 221, the second transparent substrate 225 and the third transparent substrate 229 are in a flat shape, a thin-slip shape and a transparent form, and the first transparent substrate 221, the second transparent substrate 225 and the third transparent substrate 229 are made of plastic, polymer plastic, glass or a plastic polymer selected from the collection of resin, a material selected from the collection of plastic, polymer plastic and glass, or a plastic polymer selected from the collection of resin, polyethylene terephthalate (PET), polycarbonate (PC), polyethylene (PE), polyvinyl chloride (PVC), and polymethylmethacrylate (PMMA) or their mixture.

Wherein, the first transparent conductive unit 222, the second transparent conductive unit 224, the third transparent conductive unit 226 and the fourth transparent conductive unit 228 are made of impurity-doped oxides selected from the collection of indium tin oxide (ITO), indium zinc oxide (IZO), al-doped ZnO (AZO) and antimony tin oxide (ATO).

Wherein, the first transparent conductive unit 222, the second transparent conductive unit 224, the third transparent conductive unit 226 and the fourth transparent conductive unit 228 are made of a material selected from the collection of poly-3,4-Ethylenedioxythiophene (PEDOT), polyaniline and carbon nanotube.

The first electrochromic elements 223 are disposed at the top of the first transparent conductive unit 222. The second transparent conductive unit 224 is disposed at the top of the first electrochromic elements 223, such that the first electrochromic elements 223 are disposed between the first transparent conductive unit 222 and the second transparent conductive unit 224. The second transparent substrate 225 is disposed at the top of the second transparent conductive unit 224. The third transparent conductive unit 226 is disposed at the top of the second transparent substrate 225. The second electrochromic elements 227 are disposed at the top of the third transparent conductive unit 226. The fourth transparent conductive unit 228 is disposed at the top of the second electrochromic elements 227, such that the second electrochromic elements 227 are disposed between the third transparent conductive unit 226 and the fourth transparent conductive unit 228. The third transparent substrate 229 is disposed at the top of the fourth transparent conductive unit 228. In this preferred embodiment, the first electrochromic elements 223 and the second electrochromic elements 227 are solution type electrochromic elements. The first isolating units 2220 are arranged with an interval apart from each other and disposed between the first electrochromic elements 223 for isolating/sealing each first electrochromic element 223, such that during the coloration of the first electrochromic elements 223, the first electrochromic elements 223 are in the grid form. The second isolating units 2221 are arranged with an interval apart from each other and disposed between the second electrochromic elements 223 for isolating/sealing each second electrochromic element 227, such that during the coloration of the second electrochromic elements 227, the second electrochromic elements 227 are in the grid form. In this preferred embodiment, the first isolating units 2220 and the second isolating units 2221 include but not limited to photoresist and silicon dioxide ($SiO_2$). In addition, the first electrochromic element 223 and the second electrochromic element 227 are made of glass, plastic, metal, UV glue or other cured plastic, and the first electrochromic elements 223 are packaged between the first and second transparent substrates (not shown in the figure) and the second electrochromic elements 227 are packaged between the second and third transparent substrate (not shown in the figure).

In addition, the first electrochromic elements 223 and the second electrochromic elements 227 are disposed in different directions, preferably arranged orthogonally with each other, but the present invention is not limited to such arrangement only. In other words, when the first electrochromic elements 223 are arranged horizontally, the second electrochromic elements 227 are arranged vertically, and when the first electrochromic elements 223 are arranged vertically, the second electrochromic elements 227 are arranged horizontally. The first isolating units 2220 and the second isolating units 2221 arranged orthogonally with respect to the arrangement of the first electrochromic elements 223 and the second electrochromic elements 227.

Further, the first electrochromic elements 223 and the second electrochromic elements 227 are produced by dissolving at least one organic electrochromic material and at least one inorganic electrochromic material into a solvent, but the invention is not limited to such arrangement only, and the organic electrochromic material can be selectively one or more types, and the inorganic electrochromic material can also be selectively one or more types.

The organic electrochromic material is one selected from the collection of a redox indicator, a pH indicator (acid-base indicator) or any other organic compound.

Wherein, the redox indicator can be methylene blue, ($C_{16}H_{18}ClN_3S.3H_2O$), viologen, N-phenyl-o-anthranilic acid ($C_{13}H_{11}NO_2$), sodium diphenylamine sulfonate ($C_{12}H_{10}NNaO_3S$) dichlorophenolindophenol sodium ($C_{12}H_6Cl_2NNaO_2$), N,N'-diphenylbenzidine ($C_{20}H_{20}N_2$), wherein the viologen has different colors due to the length of carbon chain of the R substitute radical or different structures, and R substitute radical can be methyl, ethyl, propyl, butyl, pentyl, hexyl, heptyl, octyl, iso-pentyl, or benzyl radical selected from the collection of 1,1'-dimethyl-4,4'-bipyridinium dichloride hydrate (MV), 1,1'-diheptyl-4,4'-bipyridinium dibromide (HV), 1,1'-dibenzyl-4,4'-bipyridinium dichloride hydrate (BV), 1,1'-bis(2,4-dinitrophenyl)-4,4'-bipyridinium dichloride, 1,1'-di-n-octyl-4,4'-bipyridinium dibromide, octyl, 1,1'-diphenyl-4,4'-bipyridinium dichloride and 4,4'-bipyridyl.

The pH indicator in accordance with a preferred embodiment can be variamine blue B diazonium salt ($C_{13}H_{12}ClN_3O$).

The organic compound in accordance with a preferred embodiment can ferrocene [$Fe(C_5H_5)_2$] or 7,7,8,8-Tetracyanoquinodimethane.

Wherein, the inorganic electrochromic material is an inorganic derivative such as an oxide, a sulfide, a chloride and a hydroxide of a transition element, and the transition element one selected from the collection of a scandium subgroup (IIIB), a titanium subgroup (IVB), a chromium subgroup (VIB), a manganese subgroup (VIIB), an iron series (VIII), a copper subgroup (IB), a zinc subgroup (IIB) a vanadium subgroup (VB), and a platinum series (Group VIII of Fifth and Sixth Periods), and the inorganic derivative is one selected from the collection of a halogen group (VIIA), an oxygen group (VIA), a nitrogen group (VA), a carbon group (IVA), a boron group (IIIA), an alkali earth metal group (IIA) or an alkali metal group (IA).

Further, the inorganic electrochromic material is preferably one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr).

The solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfon, 3-methyl sulfone and their mixtures.

Since there is a leakage problem if the electrochromic element is in a liquid state, and grid lines are formed during the coloration, deformations will occur easily if a slight external force is applied. Therefore, the electrochromic element can further include an electrolytic material or a macromolecular polymer to overcome the aforementioned problem, and the uniformity of the coloration is better than the pure solution. Wherein, the electrolytic material is selected from the collection of lithium perchlorate ($LiClO_4$), potassium hydroxide (KOH), sodium hydroxide (NaOH) and sodium silicate ($Na_2SiO_3$); the macromolecular polymer is one selected from the collection of a highly fluorinated resin, poly(2-acrylamido-2-methyl-1-propanesulfonic acid) (PA-MAS), poly(vinylalcohol phosphoric acid) (PAVA), polyethylene oxide (PEO), polyethyleneimine (PEI), tetrabutylammonium tetrafluoroborate, polymethylmethacrylate (PMMA), phenyl acid phosphate (PAP), polyvinyl pyrrolidon (PVP) and their mixture.

The operation principle of the first electrochromic elements 223 and the second electrochromic elements 227 adopts the complementary effect of the organic electrochromic material and the inorganic electrochromic material to concurrently provide the redox feature, and the transparent conductive unit provides electrons, such that the valence of ions of the electrochromic material can be changed for a coloration by the mobility and transfer of electrons. Compared with the conventional coloration mechanism of the electrochromic material by the concurrent intercalation and de-intercalation of electrons and ions, the driving method of the present invention provides a quick and uniform coloration with the features of a less driving voltage and a long lifespan. In the meantime, ultraviolet light (UV) provides energy and produces an electron mobility to the conductive units for the coloration effect. The first electrochromic elements 223 and the second electrochromic elements 227 can be mixed with a highly conductive polymer to form an electrochromic ink to be used together with a screen printing method.

Examples of various different groups of the inorganic electrochromic materials mentioned above are listed and described below:

Halogen Group (VIIA):
Solid: $I_2$ purplish black; ICl dark red; IBr dark grey; IF3 yellow; $ICl_3$ orange; $I_2O_5$ white; $I_2O_4$ yellow(ion crystal); $I_4O_9$ yellow (ion crystals).

Oxygen Group (VIA):
Solid: S light yellow; Se grey, brown; Te colorless metal luster; $Na_2S,(NH_4)_2S$, $K_2S,BaS$ white, soluble; ZnS white↓; MnS red flesh↓; FeS black↓; PbS black↓; CdS yellow↓; $Sb_2S3$ orange red↓; SnS brown↓; HgS black (precipitate), red (cinnabar red); $Ag_2S$ black↓; CuS black↓; $Na_2S_2O_3$ white; $Na_2S_2O_4$ white; $SeO_2$ white, volatile; $SeBr_2$ red; $SeBr_4$ yellow; $TeO_2$ white heated to become yellow; $H_2TeO_3$ white; $TeBr_2$ brown; $TeBr_4$ orange; $TeI_4$ grayish black; $PoO_2$ low-temperature yellow (face-centered cube), high-temperature red (tetrahedron); $SO_3$ colorless; $SeO_3$ colorless easily soluble in water; $TeO_3$ orange; $H_6TeO_6$ colorless.

Nitrogen Group (VA):
Solid: ammonium salt colorless crystal; nitrified metal white; $N_2O_3$ blue (low-temperature); $N_2O_5$ white; P white, red, black; $P_2O_3$ white; $P_2O_5$ white; $PBr_3$ yellow; $PI_3$ red; $PCl_5$ colorless; $P_4S_x$ yellow; $P_2S_3$ grayish yellow; $P_2S_5$ light yellow; $H_4P_2O_7$ colorless glass form; $H_3PO_2$ white; As grey; $As_2O_3$ white; $As_2O_5$ white; $AsI_3$ red; $As_4S_4$ red (arsenic disulfide); $As_4S_6$ yellow(arsenic trisulphide); $As_2S_5$ light yellow; Sb silver white; $Sb(OH)_3$ white↓; $Sb_2O_3$ white (antimony white pigment); $Sb_2O_5$ light yellow; $SbX_3(X<>I)$ white; $SbI_3$ red; $Sb_2S_3$ orange red↓; $Sb_2S_5$ orange yellow; Bi silver white and slightly red; $Bi_2O_3$ light yellow; $Bi_2O_5$ reddish brown; $BiF_3$ grayish white; $BiCl_3$ white; $BiBr_3$ yellow; $BiI_3$ black↓; $Bi_2S_3$ brownish black.

Carbon Group (IVA):
Solid: C(corundum) colorless transparent; C (graphite) black color metal luster; Si grayish black color metal luster; Ge grayish white; Sn silver white; Pb dark grey; $SiO_2$ colorless transparent; $H_2SiO_3$ colorless transparent gel↓; $Na_2SiF_6$ white crystal; GeO black; $GeO_2$ white; SnO black; $SnO_2$ white; $Sn(OH)_2$ white↓; PbO yellow or yellowish red; $Pb_2O_3$ orange; $Pb_3O_4$ red; $PbO_2$ brown; $CBr_4$ light yellow; $CI_4$ light red; $GeI_2$ orange; $GeBr_2$ yellow; $GeF_4$ white; $GeBr_4$ grayish white; $GeI_4$ yellow; $SnF_2$ white; $SnCl_2$ white; $SnBr_2$ light yellow; $SnI_2$ orange; $SnF_4$ white; $SnBr_4$ colorless; $SnI_4$ red; $PbF_2$ colorless↓; $PbCl_2$ white↓; $PbBr_2$ white; $PbI_2$ gold yellow; $PbF_4$ colorless; GeS red; $GeS_2$ white; SnS brown↓; $SnS_2$ gold yellow (commonly called gold powder) ↓; PbS black↓; $PbS_2$ reddish brown; $Pb(NO_3)_2$ colorless; $Pb(Ac)_2.3H_2O$ colorless crystal; $PbSO_4$ white↓; $PbCO_3$ white↓; $Pb(OH)_2$ white↓; $Pb_3(CO_3)_2(OH)_2$ lead white↓; $PbCrO_4$ white yellow↓.

Boron Group (IIIA):
Solid: B (with no fixed shape) brown powder; B(crystal) grayish black; Al silver white; Ga silver white (easily liquefied); In silver grey; Tl silver grey; $B_2O_3$ glass form; $H_3BO_3$ colorless sheet form; BN white; $Na_2B_4O_7.10H_2O$ white crystal; $Cu(BO_2)_2$ blue ↓; $Ni(BO_2)_2$ green ↓; $NaBO_2.Co(BO_2)_2$ blue ↓; $NaBO_2.4H_2O$ colorless crystal; non-aqueous $NaBO_2$ yellow crystal; $Al_2O_3$ white crystal; $AlF_3$ colorless; $AlCl_3$ white; $AlBr_3$ white; $AlI_3$ brown; $Al(OH)_3$ white↓; $Ga_2O_3$ white↓ $Ga(OH)_3$ white↓; $GaBr_3$ white; $GaI_3$ yellow; $In_2O_3$ yellow; $InBr_3$ white; $InI_3$ yellow; TlOH yellow; $Tl_2O$ black; $Tl_2O_3$ brownish black; TlCl white↓; TlBr light yellow↓; TlI yellow↓ (similar to silver); $TlBr_3$ yellow; $TlI_3$ black.

Alkali Earth Metal (IIA):
Elementary substance: silver white
Flame color: Ca brick red; Sr magneta; Ba green.
Oxides: All oxides are white solids.
Hydroxides: White solids $Be(OH)_2$↓, $Mg(OH)_2$↓.
Salts: Most salts are colorless or white crystals; $BeCl_2$ light yellow; $BaCrO_4$ yellow↓; $CaF_2$ white↓.

Alkali Metal (IA):
Elementary substance: silver white
Flame color: Li red; Na yellow; K purple; Rb purplish red; Cs purplish red.
Oxide, Peroxide, Super Oxide, Ozonide: $Li_2O$ white; $Na_2O$ white; $K_2O$ light yellow; $Rb_2O$ white yellow; $Cs_2O$ orange red; $Na_2O_2$ light yellow; $KO_2$ orange yellow; $RbO_2$ dark brown; $CsO_2$ dark yellow; KO orange red.
Hydroxide: white, LiOH white↓.
Salt: Most salts are colorless or white crystals and easily soluble in water.
Insoluble salt↓ (all are white crystals unless otherwise stated): LiF $Li_2CO_3$ $Li_3PO_4$ $LiKFeIO_6$ $Na[Sb(OH)_6]NaZn(UO_2)_3(Ac)_9.6H_2O$ yellow green; M=K,Rb,Cs $M_3[Co(NO_2)_6]$white yellow; $MBPh_4$ $MClO_4$ $M_2PtCl_6$ light yellow; $CsAuCl_4$.

Copper Subgroup (IB):
Elementary substance: Cu purplish red or dark red; Ag silver white; Au gold yellow.
Copper compound: Flame color green; CuF red; CuCl white↓; CuBr yellow↓; CuI brownish yellow↓; CuCN white↓; $Cu_2O$ dark red; $Cu_2S$ black; $CuF_2$ white; $CuCl_2$ brownish yellow (yellowish green solution); $CuBr_2$ brown; $Cu(CN)_2$ brownish yellow; CuO black↓; CuS black↓; $CuSO_4$ colorless; $CuSO_4.5H_2O$ blue; $Cu(OH)_2$ light blue↓; $Cu(OH)_2.CuCO_3$ green black; $[Cu(H_2O)_4]^{2+}$ blue; $[Cu(OH)_4]^{2-}$ bluish purple; $[Cu(NH3)_4]^{2+}$ dark blue; $[CuCl_4]^{2-}$ yellow; $[Cu(en)_2]^{2+}$ dark bluish purple; $Cu_2[Fe(CN)_6]$brown red; cuprous acetylide red↓.

Silver compound: AgOH white (decomposed at normal temperature); $Ag_2O$ black; freshly made AgOH brownish yellow (mixed with $Ag_2O$); silver proteinate ($AgNO_3$ dropped on hands) black↓; AgF white; AgCl white↓; Ag bright yellow↓; AgI yellow↓ (gel); $Ag_2S$black↓; $Ag_4[Fe(CN)_6]$white↓; $Ag_3[Fe(CN)_6]$white↓; $Ag^+,[Ag(NH_3)_2]^+,[Ag(S_2O_3)_2]^{3-},[Ag(CN)_2]^-$ colorless.

Gold compound: $HAuCl_4.3H_2O$ white yellow crystal; $KAuCl_4.1.5H_2O$ colorless sheet crystal; $Au_2O_3$ black; $H[Au(NO_3)_4].3H_2O$ yellow crystal; AuBr grayish yellow↓; AuI lemon yellow↓.

Zinc Subgroup (IIB):

Elementary substance: All elementary substances are silver white, and the Hg precipitate in water solution is black.

Zinc compound: ZnO white (zinc white pigment)↓; $ZnI_2$ colorless; ZnS white ↓; $ZnCl_2$ white crystal (highly soluble, water-soluble, acidic); $K_3Zn_3[Fe(CN)_6]$ white; $Zn_3[Fe(CN)_6]_2$ yellowish brown.

Cadmium compound: CdO brownish grey↓; $CdI_2$ yellow; CdS yellow (cadmium yellow pigment)↓; $HgCl_2$ (mercury perchloride) white; $HgNH_2Cl$ white↓; $Hg_2Cl_2$(mercurous chloride) white↓.

Mercury compound: HgO red (large crystal grain) or yellow (small crystal grain) ↓; $HgI_2$ red or yellow (slightly soluble); HgS black or red↓; $Hg_2NI.H_2O$ red↓; $Hg_2(NO_3)_2$ colorless crystal.

ZnS phosphor: Ag blue; Cu yellowish green; Mn orange.

Titanium Subgroup (IVB):

Titanium compound: $Ti^{3+}$ purplish red; $[TiO(H_2O_2)_2]^{2+}$ orange yellow; $H_2TiO_3$ white ↓; $TiO_2$ white (titanium white pigment) or Mona red (rutile)↓; $(NH_4)_2TiCl_6$ yellow crystal; $[Ti(H_2O)_6]Cl_3$ purple crystal; $[Ti(H_2O)_5Cl]Cl_2.H_2O$ green crystal; $TiCl_4$ colorless smoke-generating liquid.

Zirconium, hafnium: $MO_2$, $MCl_4$ white.

Vanadium Subgroup (VB):

Vanadium compound: $V^{2+}$ purple; $V^{3+}$ green; $VO^{2+}$ blue; $V(OH)^{4-}$ yellow; $VO4^{3-}$ yellow; VO black; $V_2O_3$ grayish black; $V_2S_3$ brownish black; $VO_2$ blue solid; $VF_4$ green solid; $VCl_4$ dark brown liquid; $VBr_4$ magneta liquid; $V_2O_5$ yellow or brick red; hydrate $V_2O_5$ brownish red; saturated $V_2O_5$ solution (slightly soluble) light yellow; $[VO_2(O_2)_2]^{3-}$ yellow; $[V(O_2)_3]^{3-}$ reddish brown.

Vanadium acid radical polycondensation: As the atomic number of vanadium reduces, the color changes from a light yellow to dark red~light yellow.

Columbium, tantalum: omitted.

Chromium Subgroup (VIB):

Chromium compound: $Cr^{2+}$ blue; $Cr_{3+}$ purple; $Cr_2O_7^{2-}$ orange red; $CrO_4^{2-}$ yellow; $Cr(OH)^{4-}$ bright green; $Cr(OH)_3$ grayish blue; $Cr_2O_3$ green; $CrO_3$ dark red needle shape; $[CrO(O_2)_2]OEt_2$ blue; $CrO_2Cl_2$ dark red liquid; $Na_2Cr_2O_7,K_2CrO_7$ orange red; $Ag_2CrO_4$ brick red↓; $BaCrO_4$ yellow↓; $PbCrO_4$ yellow↓.

Purplish red $Cr_2(SO_4)_3.18H_2O$->Green $Cr_2(SO_4)_3.6H_2O$->Peach red$Cr_2(SO_4)_3$ Dark green $[Cr(H_2O)_4Cl_2]Cl$-cooling HCl->purple $[Cr(H_2O)_6]Cl_3$-ethylether HCl->light green $[Cr(H_2O)_5Cl]Cl_2$ $[Cr(H_2O)_6]^{3+}$ purple; $[Cr(H_2O)_4(NH_3)_2]^{3+}$ purplish red; $[Cr(H_2O)_3(NH_3)_3]^{3+}$ light red; $[Cr(H_2O)_2(NH_3)_4]^{3+}$ orange red; $[Cr(NH_3)_5H_2O]^{3+}$ orange yellow; $[Cr(NH_3)_6]^{3+}$ yellow.

Molybdenum, tungsten: $MoO_3$ white; brown$MoCl_3$; green $MoCl_5$; $MoS_3$ brown↓; $(NH_4)_3[P(Mo_{12}O_{40}].6H_2O$ yellow crystal form↓; $WO_3$ dark yellow; $H_2WO_4.xH_2O$ white gel.

Manganese Subgroup (VIIB):

Manganese compound: $Mn^{2+}$ flesh red; $Mn^{3+}$ purplish red; $MnO_4^{2-}$ green; $MnO_4^-$ purple; $MnO^{3+}$ bright green; $Mn(OH)_2$ white↓; $MnO(OH)_2$ brown↓; $MnO_2$ black↓; non-aqueous manganese salt ($MnSO_4$) white crystal; hexahydrate manganese salt ($MnX_2.6H_2O$, X=halogen, $NO_3$, $ClO_4$) pink; $MnS.nH_2O$ flesh red↓; non-aqueous MnS dark green; $MnCO_3$ white↓; $Mn_3(PO_4)_2$ white↓; $KMnO_4$ purplish red; $K_2MnO_4$ green; $K_2[MnF_6]$ gold yellow crystal; $Mn_2O_7$ brown oily liquid.

Technetium, Rhenium: omitted.

Iron Series (Group VIII of Fourth Period):

Iron compound: $Fe^{2+}$ light green; $[Fe(H_2O)_6]^{3+}$ light purple; $[Fe(OH)(H_2O)_5]^{2+}$ yellow; $FeO_4^{2-}$ purplish red; FeO black; $Fe_2O_3$ dark red; $Fe(OH)_2$ white↓; $Fe(OH)_3$ brownish red↓; $FeCl_3$ or $FeCl_2$ crystal brown red blue; non-aqueous $FeSO_4$ white; $FeSO_4.7H_2O$ green; $K_4[Fe(CN)_6]$(yellow prussiate) yellow crystal; $K_3[Fe(CN)_6]$(red prussiate) red crystal; $Fe_2[Fe(CN)_6]$ Prussian blue ↓; $Fe[Fe(CN)_6]$black↓; $Fe(C_5H_5)_2$ (ferrocene) orange yellow crystal; $M_2Fe_6(SO_4)_4(OH)_{12}$(yellow ferrous sulfate, M=$NH_4$, Na, K) light yellow crystal; $Fe(CO)_5$ yellow liquid.

Cobalt compound: $Co^{2+}$ pink; CoO grayish green; $CO_3O_4$ black; $Co(OH)_3$ brown↓; $Co(OH)_2$ pink↓; $Co(CN)_2$ red; $K_4[Co(CN)_6]$ purple crystal; $CO_2(CO)_8$ yellow crystal; $[Co(SCN)_6]_4-$ purple;

Cobalt chloride is dehydrated into pink $CoCl_2.6H_2O$-325K->purplish red CoCl. $2H_2O$-313K->bluish purple $CoCl_2.H_2O$-393K->blue $CoCl_2$.

Nickel compound: $Ni^{2+}$ bright green; $[Ni(NH3)_6]^{2+}$ purple; $Ni(OH)_2$ green ↓; $Ni(OH)_3$ black↓; non-aqueous Ni(II) salt yellow; $Na_2[Ni(CN)_4]$ yellow; $K_2[Ni(CN)_4]$ orange; $Ni(CO)_4$ colorless liquid.

Platinum Series Element (Group VIII of Fifth and Sixth Periods):

Os bluish grey volatile solid; Pd↓(aq) black; $OsO_4$ colorless special-odor gas; $H_2PtCl_6$ orange red crystal; $Na_2PtCl_6$ orange yellow crystal; $M_2PtCl_6$(M=K, Rb, Cs, $NH_4$) yellow↓.

The principle of coloration of liquid electrochromic element is illustrated below, wherein ferrous chloride ($FeCl_2$) in the iron series (VIIIB) and methylene blue are used as examples, and dimethyl sulfoxide (DMSO) is used as the solvent to produce an electrochromic solution of a complementary system, and ferrous chloride crystal particles are in blue color (since $Fe^{2+}$ is blue), and the oxidized surface is in a reddish brown color (since $Fe^{3+}$ is light yellow). If ferrous chloride is dissolved in a solvent, $Fe^{2+}$ will be oxidized to form $Fe^{3+}$, the solvent will become light yellow. The first transparent conductive unit 222, the second transparent conductive unit 224, the third transparent conductive unit 226 or the fourth transparent conductive unit 228 supplies electrons, such that when methylene blue molecules of the transparent conductive unit approaching to the transparent electrically conductive element obtain electrons to produce a reduction, the methylene blue becomes a free radical, and when the external voltage is removed, $Fe^{3+}$ and the methylene blue free radical have different electric potentials (or the methylene blue free radical has a lower electric potential than that of $Fe^{3+}$), and electrons will be transmitted from the methylene blue free radical to $Fe^{3+}$, so that the light yellow $Fe^{3+}$ is reduced to the blue $Fe^{2+}$, and the first electrochromic elements 223 and the second electrochromic elements 227 change their color from light yellow to blue due to the change of valence, so as to achieve a dark color change effect to produce a parallax barrier. If the electrons of the first transparent conductive unit 222, the second transparent conductive unit 224, the third transparent conductive unit 226 or the fourth transparent conductive unit 228 are short-circuited or loaded by reverse voltage, the valence is changed due to the oxidation of the corresponding first electrochromic elements 223 or second electrochromic elements 227 to change the color from blue to light yellow to achieve the decoloration effect. In addition, the thickness of the first electrochromic elements 223 and the second electrochromic elements 227 can be controlled to achieve the effect of displaying a light yellow color almost in a transparent colorless form. Further, the solution concentration, potential difference, solvent polarity, pH value, electrode gap and dielectric constant of the electrochromic solution can be adjusted to produce a blue, purple, pink, and light yellow color display.

The materials of the first electrochromic elements 223 and the second electrochromic elements 227 further comprise at least one inert conductive salt, and the inert conductive salt can be a lithium, sodium, or tetra-alkylamine salt.

The control unit 23 is electrically coupled to the first transparent conductive unit 222, the second transparent conductive unit 224, the third transparent conductive unit 226 and the fourth transparent conductive unit 228 for controlling the electric bias voltage of the conductive units.

The sensing unit 24 is electrically coupled to the control unit 23, and the sensing unit 24 is provided for sensing the direction of the 3D image display device 2 with respect to a horizontal datum plane. In this preferred embodiment, the sensing unit 24 is gyroscope, or an optoelectronic direction sensor, but the invention is not limited to such arrangement only.

With reference to FIGS. 6 to 9 for a perspective view of a 3D image display device, a schematic view of a first coloration status of an electrochromic element, a first schematic view of forming a 3D image and a second schematic view of forming a 3D image in accordance with the present invention, the plane for the 3D image display device 2 to display images is defined as a datum plane, and the axis perpendicular to the datum plane is defined as a rotation axis, and the horizontal and vertical directions of the datum plane are defined as the horizontal direction and the vertical direction respectively. Compared with the rotation axis, the bias voltage of the first and second transparent conductive units 222, 224 will be changed once for every ¼ round of the rotation to switch the parallax barrier in a horizontal direction or a vertical direction. For example, if the 3D image display device is disposed in a horizontal direction, then the control unit 23 will apply a bias voltage to the third transparent conductive unit 226 and the fourth transparent conductive unit 228. The second electrochromic elements 227 have a change of valence number of electrons due to the electron mobility of the third transparent conductive units 226 or the fourth transparent conductive units 228, such that the second electrochromic elements 227 is switched from the coloration state to the decoloration state to produce a parallax barrier. Therefore, the left-eye image L and right-eye image R produced by the display module 21 are overlapped to produce an overlapped image, and passed through a light shelter area formed by the parallax barrier to eliminate some of the overlapped image areas, such that no moiré pattern will be produced after the naked eyes receive the image. Due to the binocular disparity of our eyes, after the left-eye image L and the right-eye image R of a viewer receives the images, the viewer can sense and determine the depth of an observing object by the image difference, and the viewer's brain merges the images into a 3D image.

Figure 10:
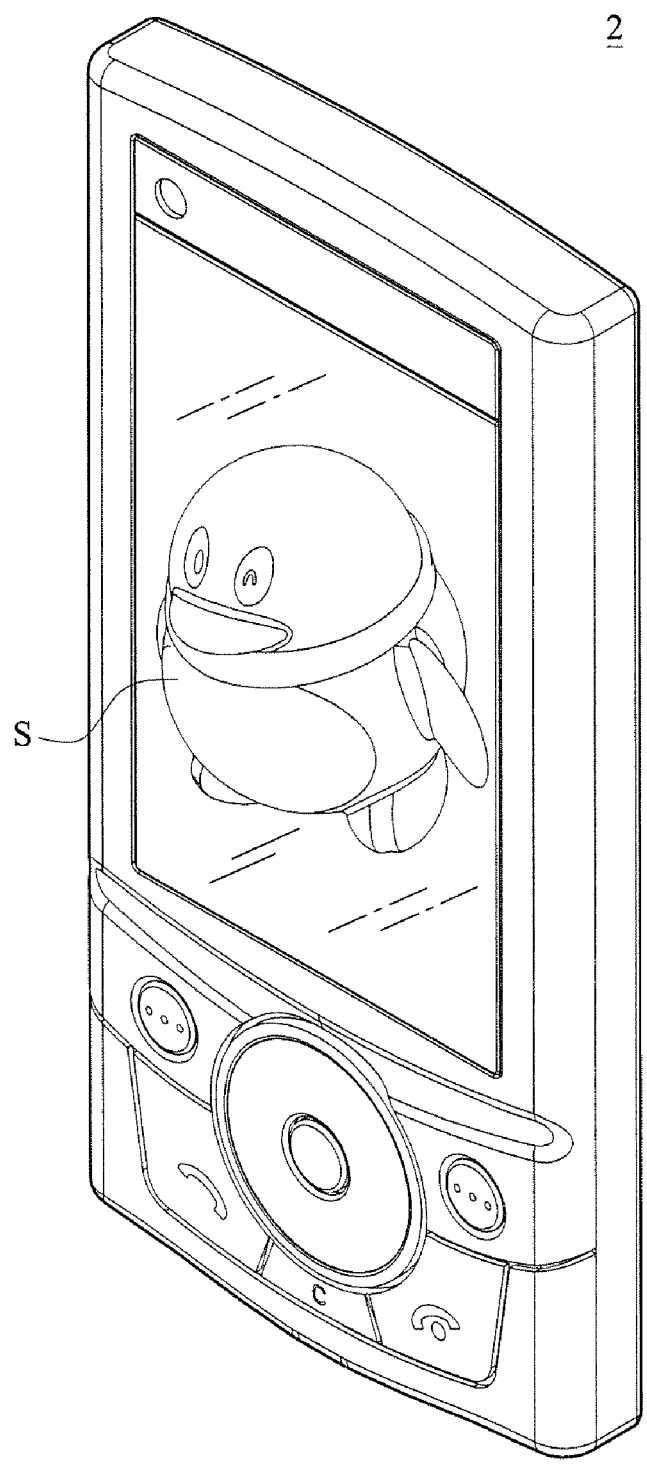
FIG. 10 is a perspective view of displaying a rotated 3D image on a 3D image display device in accordance with a first preferred embodiment of the present invention.
Figure 11:
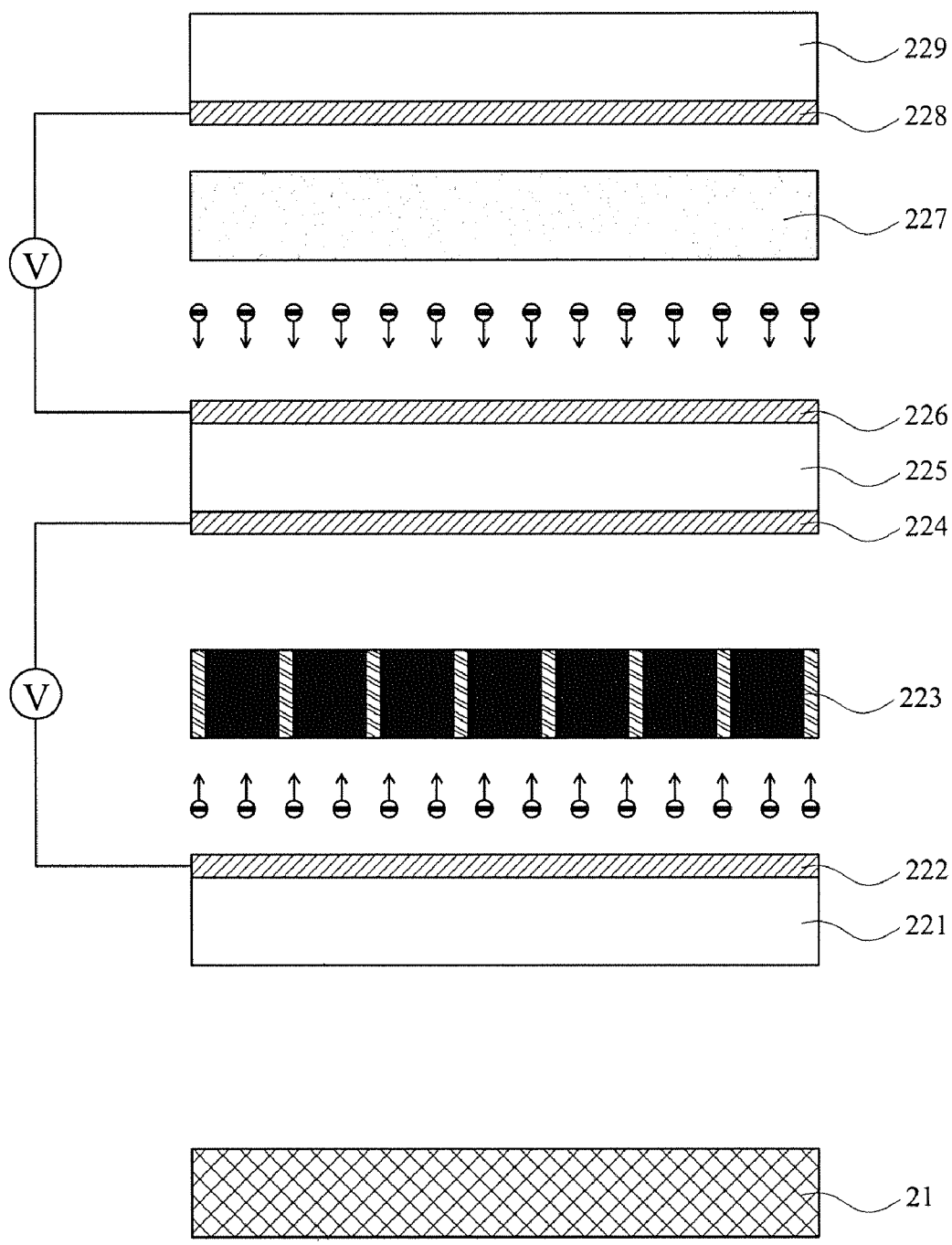
FIG. 11 is a schematic view of a second coloration status of an electrochromic element of a 3D image display device in accordance with the first preferred embodiment of the present invention.

With reference to FIGS. 10 and 11 for a perspective view of a rotated 3D image display device and a second coloration state of an electrochromic element in accordance with a first preferred embodiment of the present invention respectively, if a user rotates the 3D image display device, such that the 3D image display device is disposed in the vertical direction of the datum plane, then the sensing unit 24 will transmit a sensing signal 241 to the control unit 23, such that the control unit 23 will apply a bias voltage to the first transparent conductive unit 222 or the second transparent conductive unit 224 and the third transparent conductive unit 226 or the fourth transparent conductive unit 228 will be short circuited or loaded with a reverse voltage. Now, the second electrochromic elements 227 have a change of valence number of electrons to switch the coloration state to a decoloration state, and the parallax barrier formed by the second electrochromic elements 227 will disappear, and the first electrochromic elements 223 change the valence number of electrons to switch the decoloration state to the coloration state to produce a parallax barrier. The left-eye image L and the right-eye image R produced by the display module 21 are overlapped to form an overlapped image, and passed through a light shelter area formed by the parallax barrier to eliminate some of the overlapped image areas, such that no moiré pattern will be produced after the naked eyes receive the image. And the images are merged to form a 3D image in the viewer's brain.

Figure 12:
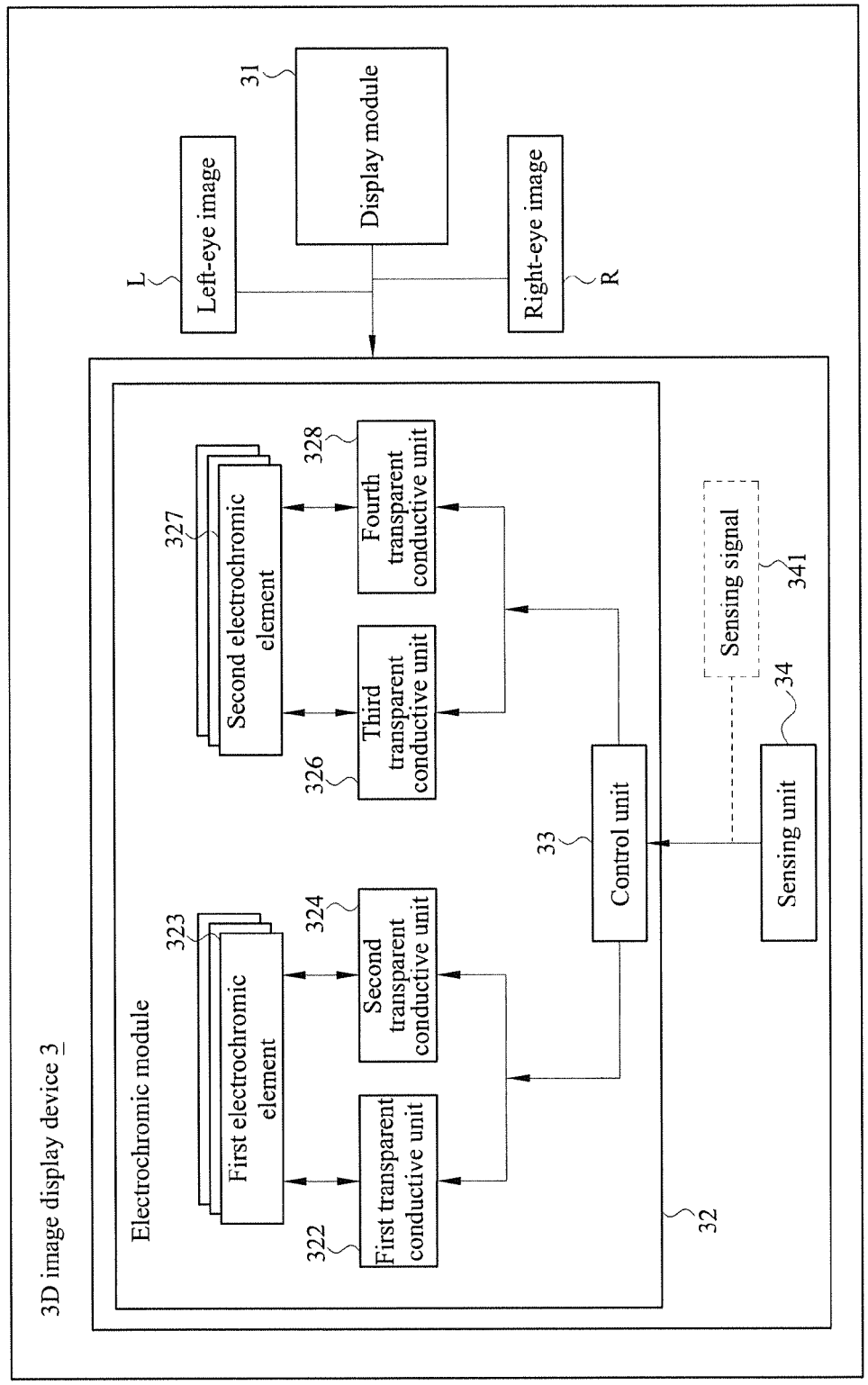
FIG. 12 is a block diagram of a 3D image display device in accordance with a second preferred embodiment of the present invention.
Figure 13:
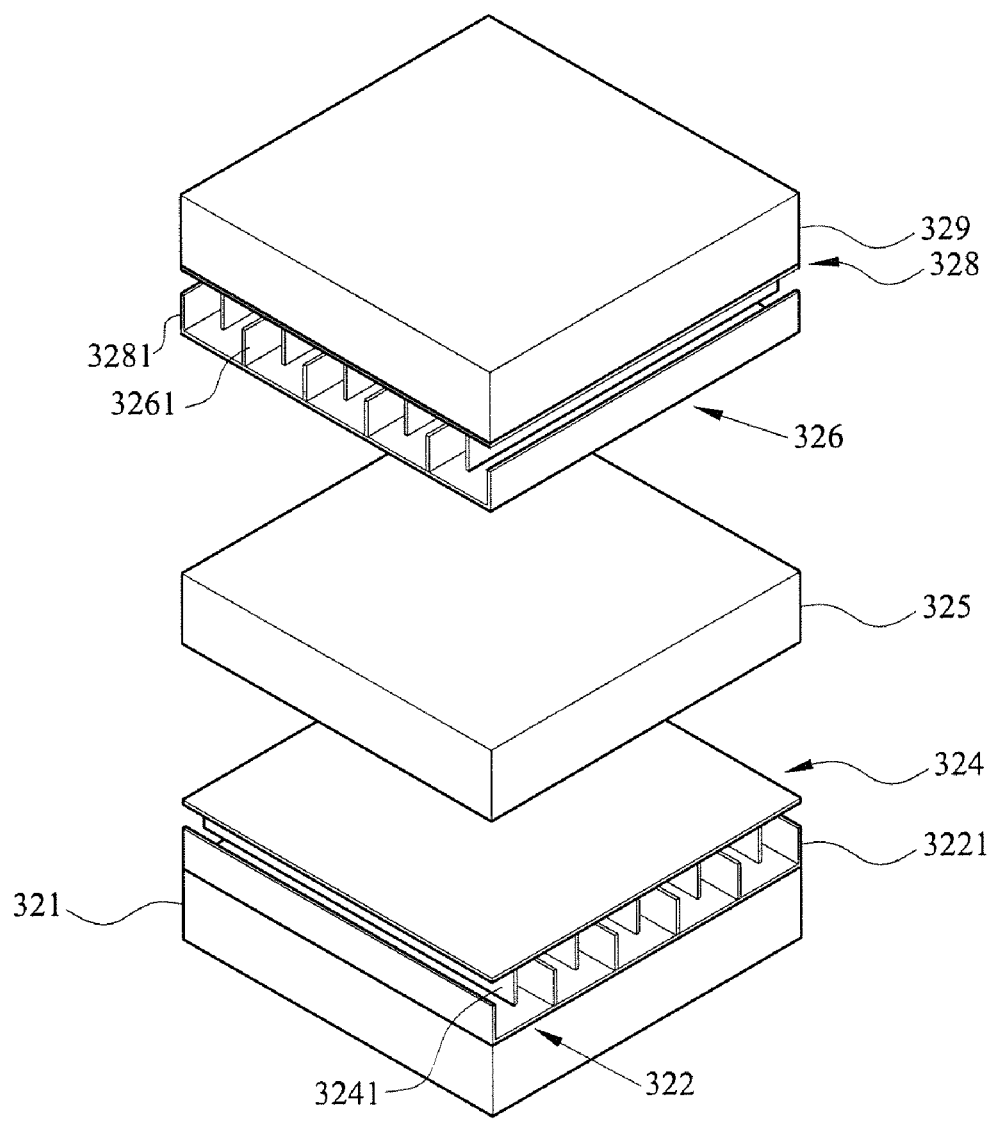
FIG. 13 is an exploded view of an electrochromic module used by a 3D image display device in accordance with a second preferred embodiment of the present invention.
Figure 14:
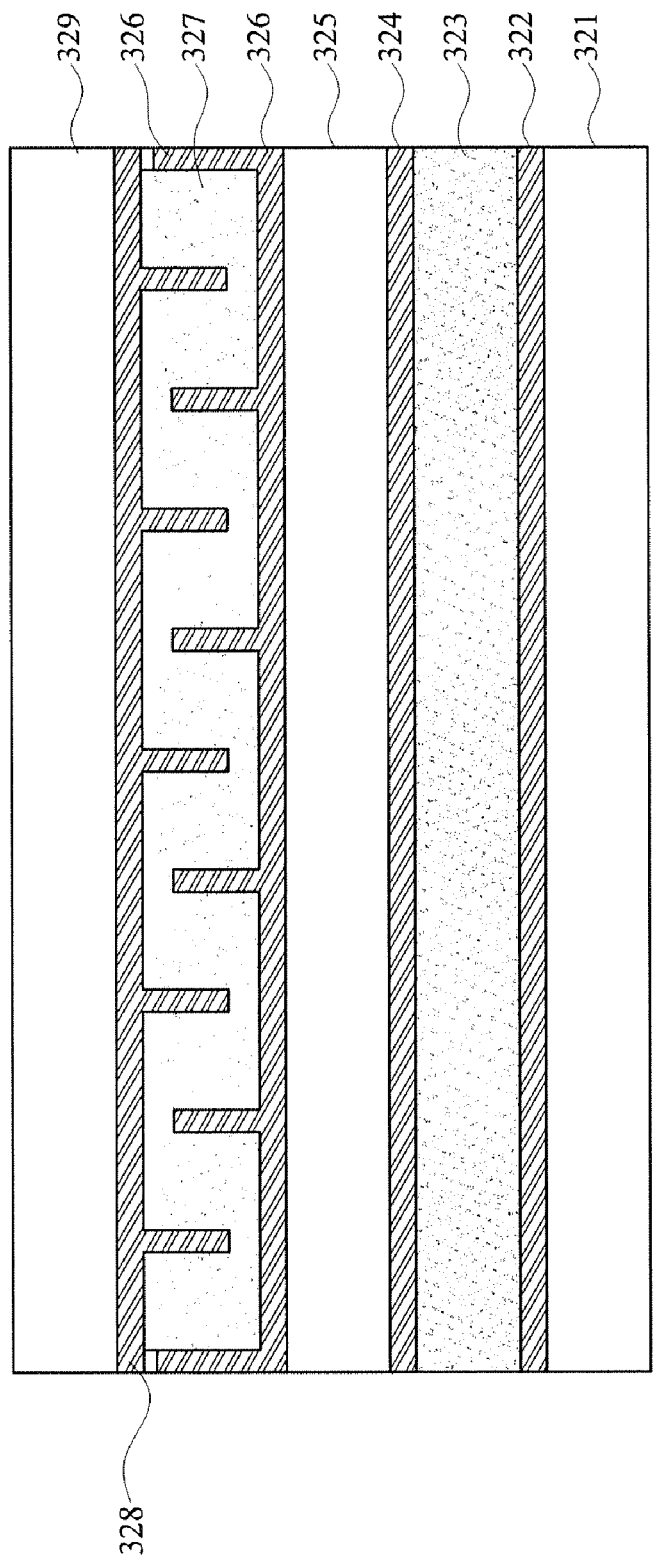
FIG. 14 is a cross-sectional view of an electrochromic module used by a 3D image display device in accordance with a second preferred embodiment of the present invention.

With reference to FIGS. 12 to 14 for a block diagram of a 3D image display device, an exploded view and a cross-sectional view of an electrochromic module in accordance with a second preferred embodiment of the present invention respectively, the 3D image display device 3 comprises a display module 31, an electrochromic module 32, a control unit 33 and a sensing unit 34, wherein, the sensing unit 34 transmits a sensing signal 341 to the control unit 33.

The electrochromic module 32 comprises a first transparent substrate 321, a first transparent conductive unit 322, a plurality of first electrochromic elements 323, a second transparent conductive unit 324, a second transparent substrate 325, a third transparent conductive unit 326, a plurality of second electrochromic elements 327, a fourth transparent conductive unit 328 and a third transparent substrate 329.

In this preferred embodiment, the structure and function of the display module 31, the control unit 33, the sensing unit 34, the first transparent substrate 321, the first electrochromic elements 323, the second transparent substrate 325, the second electrochromic elements 327 and the third transparent substrate 329 are the same as those of the first preferred embodiment, and thus they will not be described here again.

The difference of this preferred embodiment and the first preferred embodiment resides on that this preferred embodiment does not require any isolating layer made of a photoresist or silicon dioxide, and the isolating portion extended from the transparent conductive unit uses an electric field effect to isolate the solution type first electrochromic element 323 and second electrochromic elements 327, and thus there will be no cross talk to form a grid, and the plurality of first isolating portions 3221 is extended upwardly with an interval from the first transparent conductive unit 322 and plurality of second isolating portions 3241 is extended downwardly with an interval from the second transparent conductive unit 324, such that the first electrochromic elements 323 are accommodated between the first isolating portions 3221 and the second isolating portions 3241, and a plurality of third isolating portions 3261 is extended upwardly from the third transparent conductive unit 326, and a plurality of fourth isolating portions 3281 is extended downwardly from the fourth transparent conductive unit 328, such that the second electrochromic elements 327 are accommodated between the third isolating portions 3261 and the fourth isolating portions 3281. In addition, the first isolating portions 3221 are not in contact with the second transparent conductive unit 324, and the second isolating portions 3241 are not in contact with the first transparent conductive unit 322, and the third isolating portions 3261 are not in contact with the fourth transparent conductive unit 328, and the fourth isolating portions 3281 are not in contact with the third transparent conductive unit 326. In addition, the first electrochromic element 323 and the second electrochromic element 327 are made of glass, plastic, metal, UV glue or other cured plastic, and the first electrochromic elements 323 are packaged between the first and second transparent substrates (not shown in the figure) and the second electrochromic elements 327 are packaged between the second and third transparent substrate (not shown in the figure).

Figure 15:
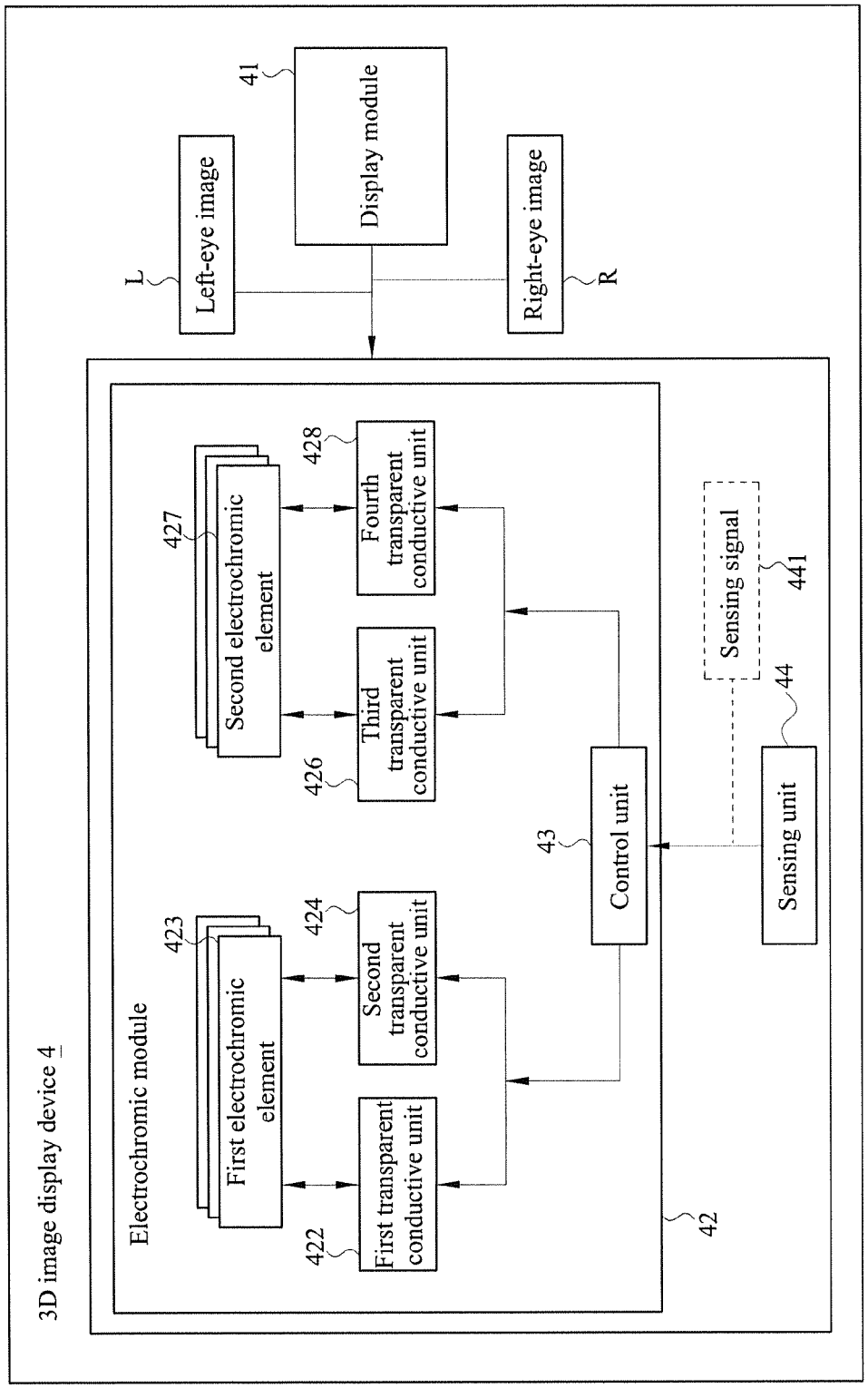
FIG. 15 is a block diagram of a 3D image display device in accordance with a third preferred embodiment of the present invention.
Figure 16:
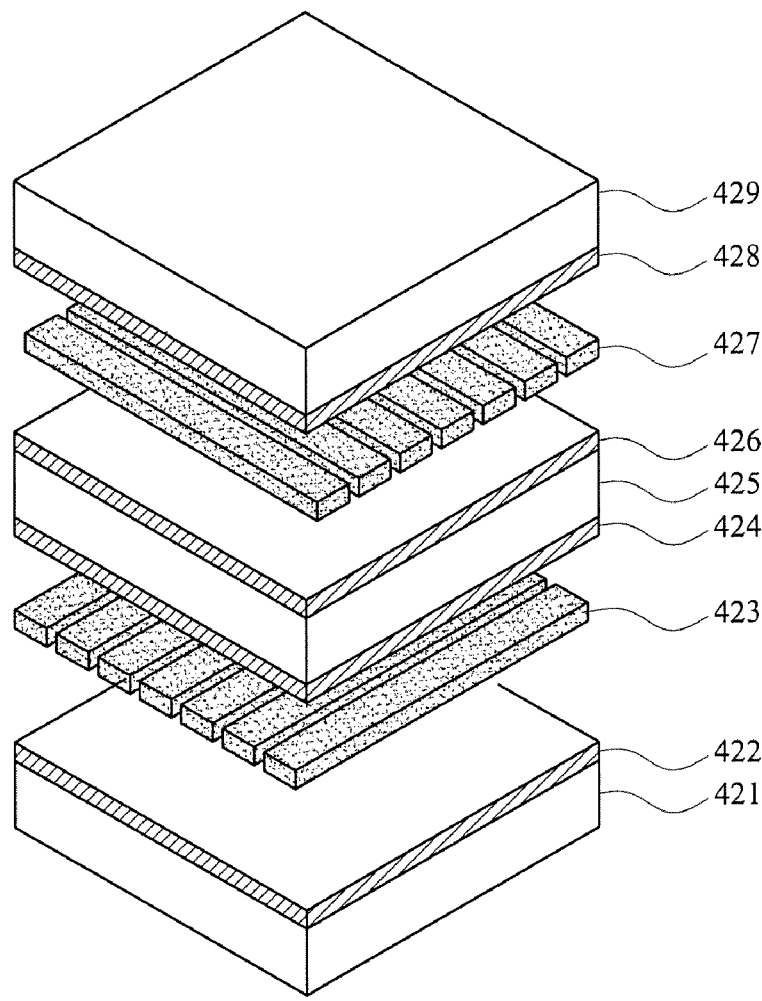
FIG. 16 is an exploded view of an electrochromic module used by a 3D image display device in accordance with a third preferred embodiment of the present invention.
Figure 17:
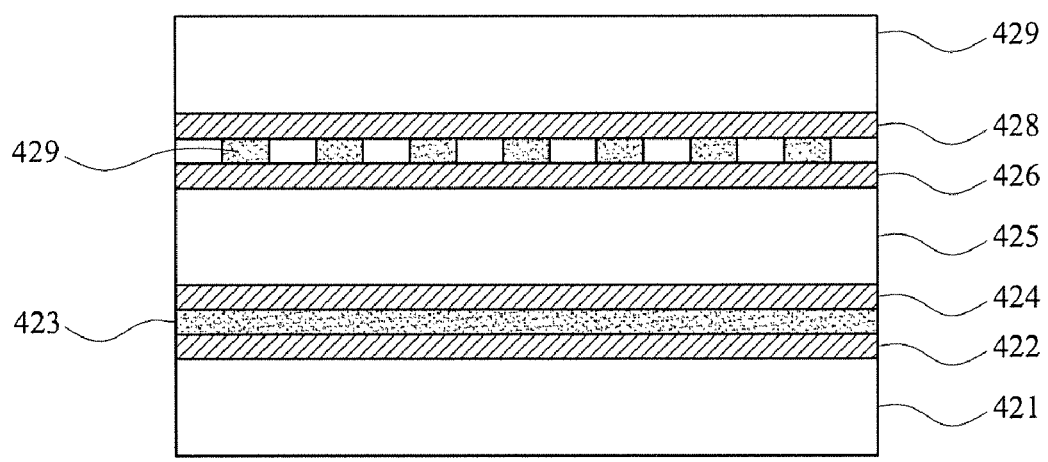
FIG. 17 is a cross-sectional view of an electrochromic module used by a 3D image display device in accordance with a third preferred embodiment of the present invention.

With reference to FIGS. 15 to 17 for a block diagram of a 3D image display device, an exploded view and a cross-sectional view of an electrochromic module in accordance with a third preferred embodiment of the present invention respectively, the 3D image display device 4 comprises a display module 41, an electrochromic module 42, a control unit 43 and a sensing unit 44, wherein the sensing unit 44 transmits a sensing signal 441 to the control unit 43.

The electrochromic module 42 comprises a first transparent substrate 421, a first transparent conductive unit 422, a plurality of first electrochromic elements 423, a second transparent conductive unit 424, a second transparent substrate 425, a third transparent conductive unit 426, a plurality of second electrochromic elements 427, a fourth transparent conductive unit 428 and a third transparent substrate 429.

In this preferred embodiment, the structure and function of the display module 41, the control unit 43, the sensing unit 44, the first transparent substrate 421, the first transparent conductive unit 422, the second transparent conductive unit 424, the second transparent substrate 425, the third transparent conductive unit 426, the fourth transparent conductive unit 428, and the third transparent substrate 429 are the same as those of the first preferred embodiment, and thus they will not be described here again.

The difference of this preferred embodiment and the first preferred embodiment resides on that the first electrochromic elements 423 and the second electrochromic elements 427 of this preferred embodiment are made by doping an electrochromic material with an electrolytic material, and the material can be in a liquid, gel or solid state. No isolating unit or isolating portion is required for a non-liquid electrochromic material, but an isolating unit (not shown in the figure) can be set between the first and second electrochromic elements 423, 427 to enhance the structural strength and extend the using life.

Wherein, the electrochromic material is one selected from the collection of a transition metal oxide of anodic coloration, a transition metal oxide of cathodic coloration, a transition metal oxide of cathodic/anodic coloration, and an organic electrochromic material, and the foregoing material is mixed and doped with an electrolytic material to form a composite material.

Wherein, the transition metal oxide of the anodic coloration is one selected from the collection of chromium oxide ($Cr_2O_3$), nickel oxide ($NiO_x$), iridium oxide ($IrO_2$), manganese oxide ($MnO_2$), nickel hydroxide [$Ni(OH)_2$], tantalum pentoxide ($Ta_2O_5$) and ferric ferrocyanide ($Fe[Fe(Cn)_6]_3$).

Wherein, the transition metal oxide of the cathodic coloration is one selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

Wherein, the transition metal oxide of cathodic/anodic coloration is one selected from the collection of vanadium oxide ($V_2O_2$), rhodium oxide ($Rh_2O_3$) and cobalt oxide ($CoO_x$).

Wherein the organic electrochromic material is a redox compound selected from the collection of bipyridyls, viologen, anthraquinone, tetrathiafulvalene, pyrazolone and their derivatives; or a conductive polymer selected from the collection of polyacetylene, polyaniline, polypyrrole, polythiophene, poly-3-alkylthiophene, polyfuran, polyphenylene, aromatic polyamide/polyimide or polyphenylenevinylene and their derivatives; or a polymer metal complex (or a coordination compound) and their derivatives; or a coordination complex of a transition metal or a lanthanide element or their derivatives; or a metal phthalocyanine and its derivative; or ferrocene, iron(III) thiocyanate dissolved in a water solution, hexacyanoferrate dissolved in a tetracyanoquino solution and tetrasulfur cyanide dissolved in an acetonitrile solution.

If the aforementioned electrochromic composite material is a solid, then the first electrochromic elements 423 disposed at the first transparent substrate 421 or the second transparent substrate 425 are formed by a sol-gel, sputtering, plating, screen printing, spraying, anodizing, photopolymerization, electrophoresis, electrochemical synthesis and deposition, or laser etching method.

The second electrochromic elements 427 are formed at the second transparent substrate 425 or the third transparent substrate 429 by a method selected from the collection of a sol-gel, sputtering, plating, screen printing, spraying, anodizing, photopolymerization, electrophoresis, electrochemical synthesis and deposition, and laser etching methods.

Wherein, some of the electrochromic materials which are transition metal oxides are listed in the following table:

| | Transition Metal Oxide | Oxidized State | Reduced state |
|---|---|---|---|
| Cathodic Coloration | $WO_3$ | Transparent | Blue |
| | $MoO_3$ | Transparent | Blue |
| | $Nb_2O_3$ | Transparent | Blue |
| | $TiO_2$ | Transparent | Dark blue/dark green |
| Anodic Coloration | $NiO_x$ | Dark bronze | Transparent |
| | $IrO_2$ | Black | Transparent |
| | $Ni(OH)_2$ | Brown | Transparent light yellow |
| | $Fe[Fe(CN)_6]_3$ | Dark blue | Transparent |
| Cathodic/Anodic Coloration | $V_2O_5$ | Grey | Yellow |
| | $CoO_x$ | Red | Blue |
| | $Rh_2O_3$ | Yellow | Green |

Further, the electrolytic material is one selected from the collection of lithium perchlorate ($LiClO_4$), potassium hydroxide (KOH), sodium hydroxide (NaOH) and sodium silicate ($Na_2SiO_3$).

Figure 18:
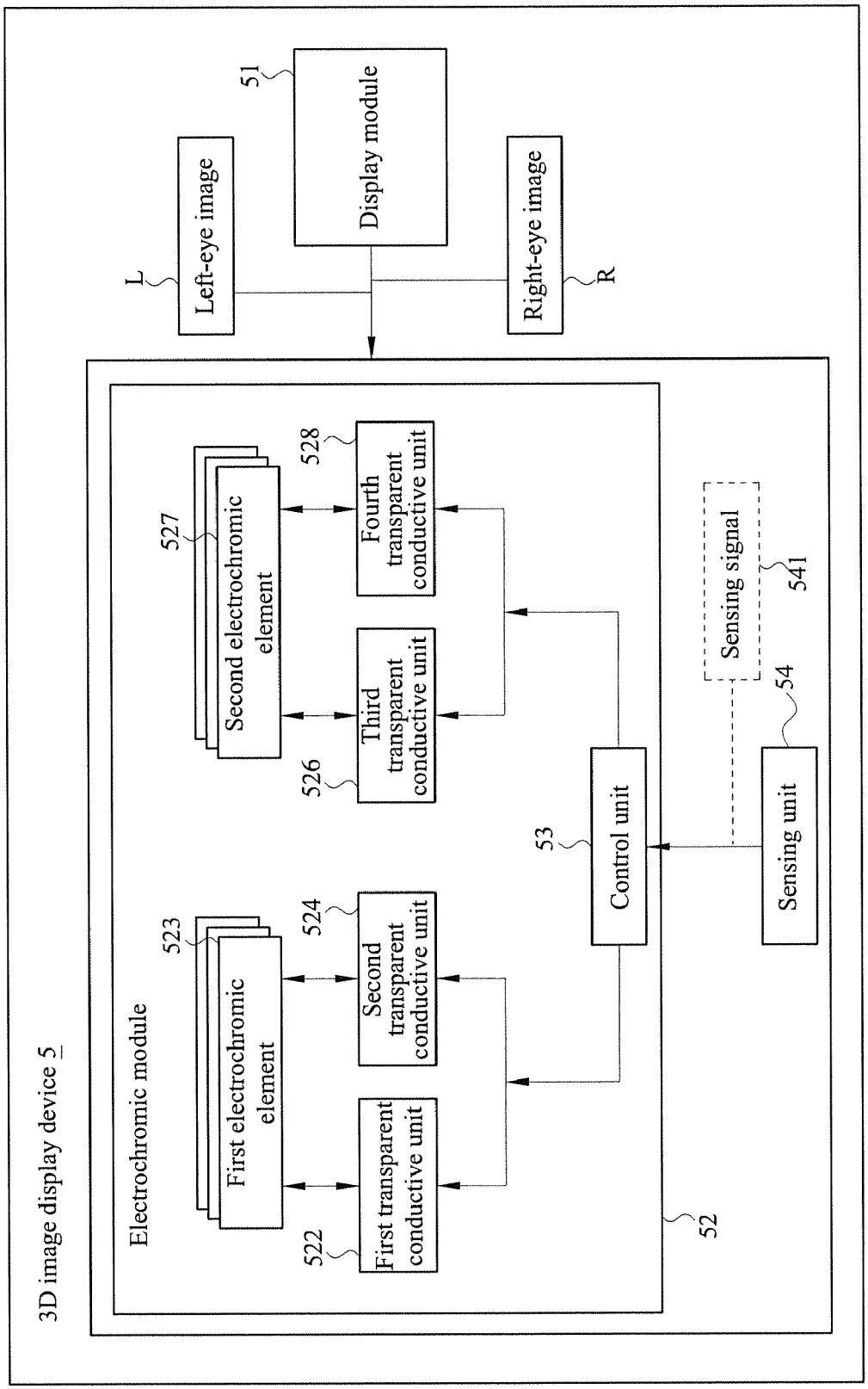
FIG. 18 is a block diagram of a 3D image display device in accordance with a fourth preferred embodiment of the present invention.
Figure 19:
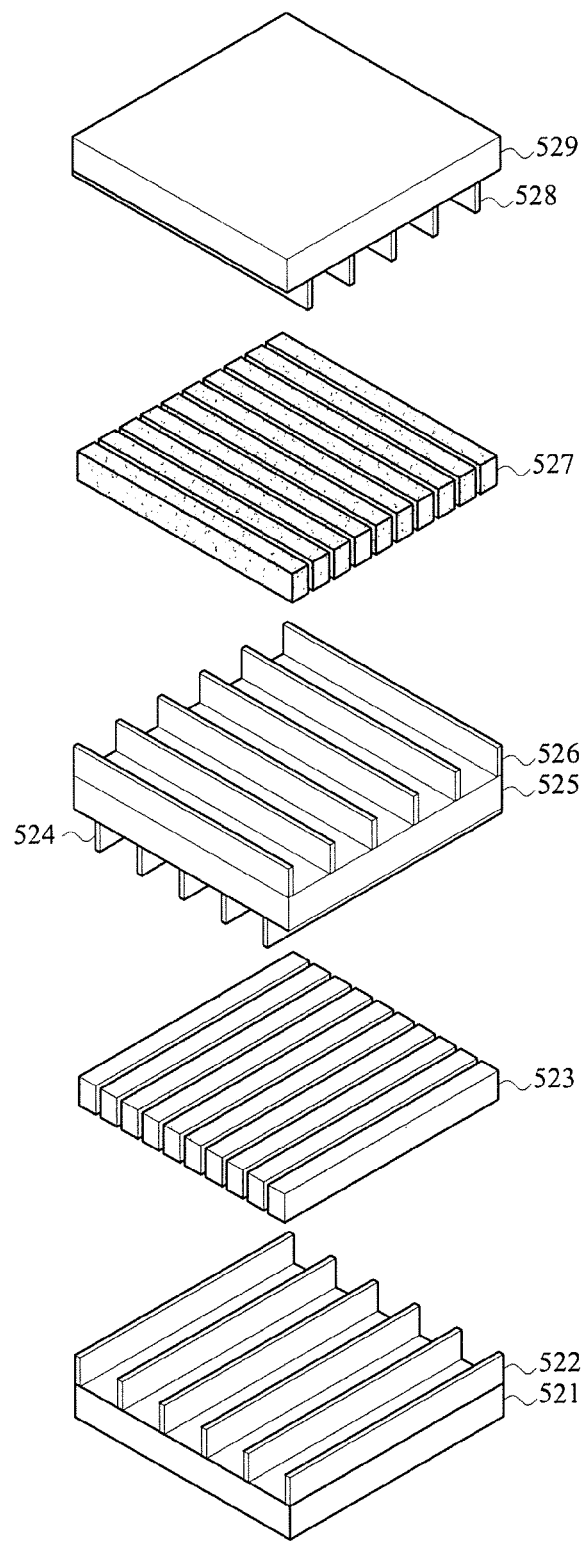
FIG. 19 is an exploded view of an electrochromic module used by a 3D image display device in accordance with a fourth preferred embodiment of the present invention.
Figure 20:
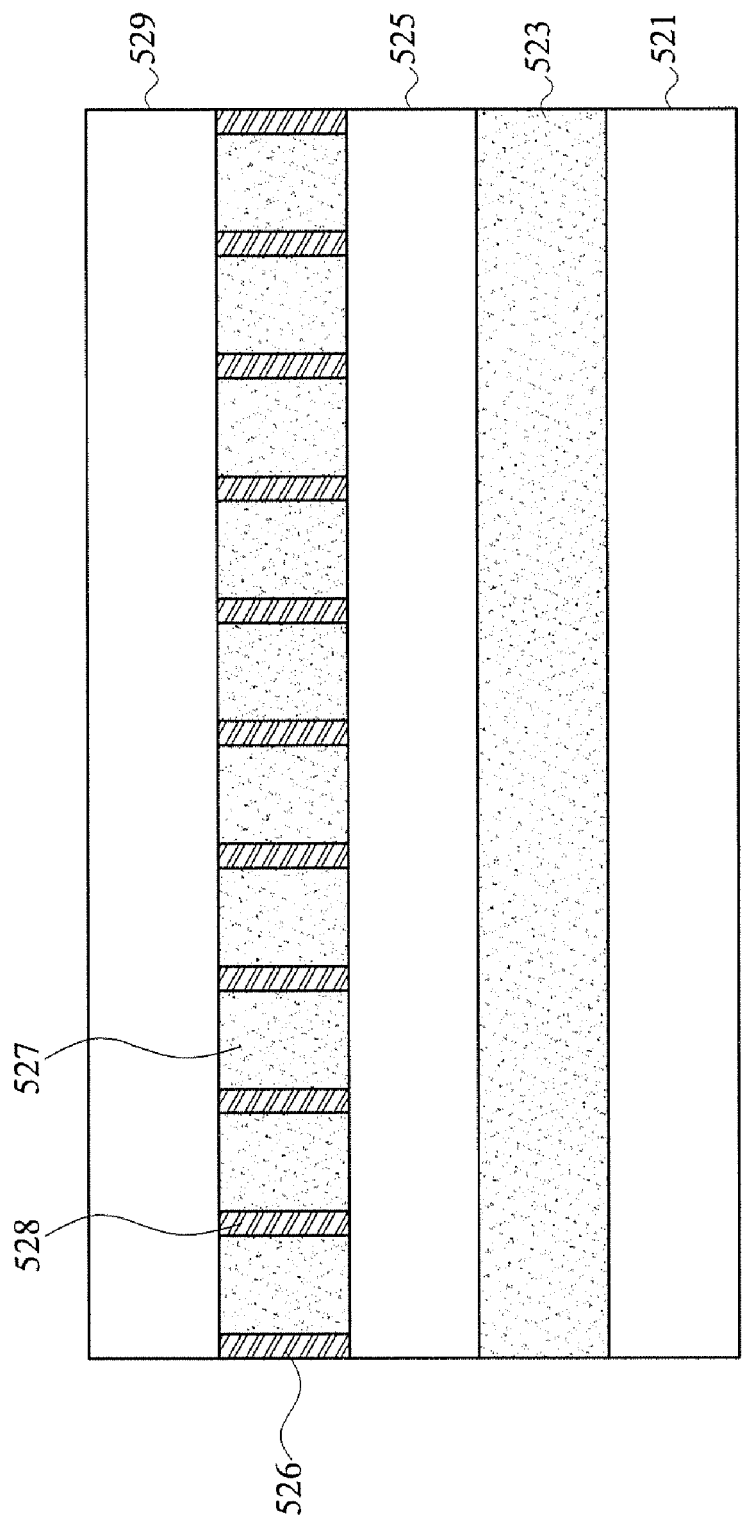
FIG. 20 is a cross-sectional view of an electrochromic module used by a 3D image display device in accordance with a fourth preferred embodiment of the present invention.

With reference to FIGS. 18 to 20 for a block diagram of a 3D image display device, an exploded view and a cross-sectional view of an electrochromic module in accordance with a fourth preferred embodiment of the present invention respectively, the 3D image display device 5 comprises a display module 51, an electrochromic module 52, a control unit 53 and a sensing unit 54.

The electrochromic module 52 comprises a first transparent substrate 521, a plurality of first transparent conductive units 522, a plurality of first electrochromic elements 523, a plurality of second transparent conductive units 524, a second transparent substrate 525, a plurality of third transparent conductive units 526, a plurality of second electrochromic elements 527, a plurality of fourth transparent conductive units 528 and a third transparent substrate 529.

The difference of this preferred embodiment and the third preferred embodiment resides on that the first transparent conductive unit 522 and the second transparent conductive unit 524 of this preferred embodiment come with a plural quantity and are arranged alternately between the first transparent substrate 521 and the second transparent substrate 525, such that each first electrochromic element 523 is disposed between the first transparent conductive unit 522 and the second transparent conductive unit 524, and the third transparent conductive unit 526 and the fourth transparent conductive unit 528 come with a plural quantity and are arranged alternately between the second transparent substrate 525 and the third transparent substrate 529, such that each second electrochromic element 527 is disposed between the third transparent conductive unit 526 and the fourth transparent conductive unit 528, and different bias voltages are applied to the first transparent conductive units 522 and the second transparent conductive units 524, such that the first electrochromic elements 523 have a coloration or decoloration caused by the change of the bias voltage, and different bias voltages are applied to the third transparent conductive units 526 and the fourth transparent conductive units 528, such that the second electrochromic element 527 have a coloration or decoloration caused by the change of the bias voltage, so as to produce a parallax barrier.

Figure 21:
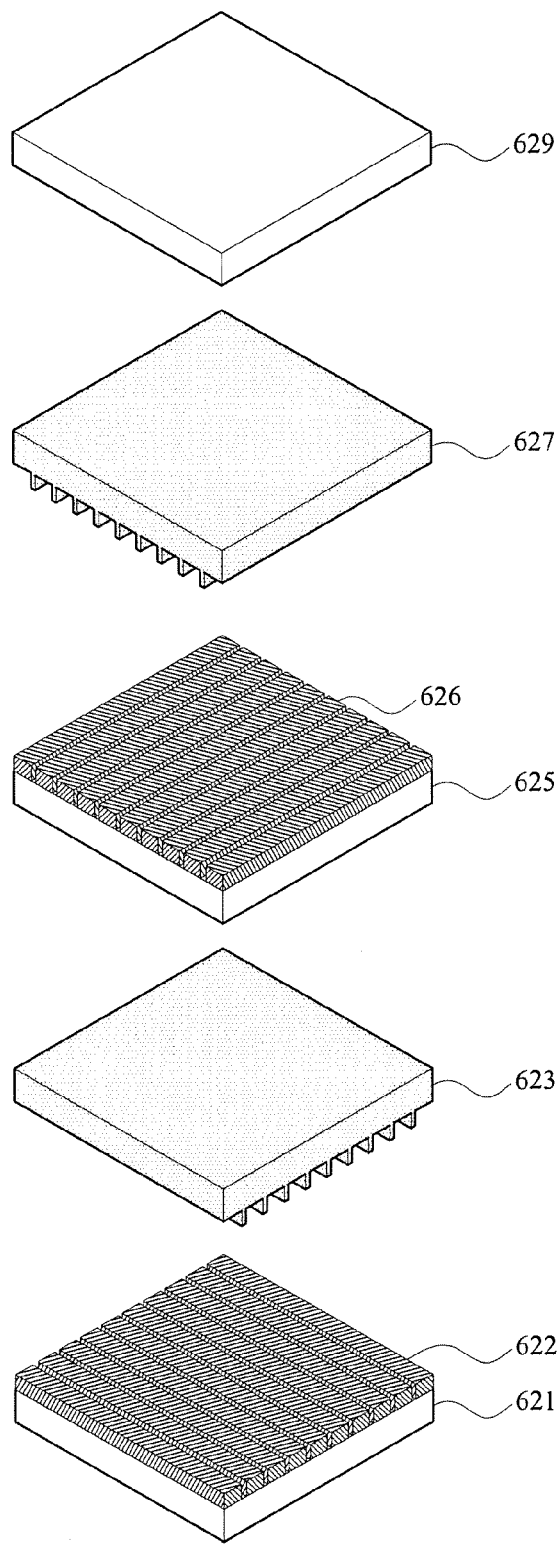
FIG. 21 is an exploded view of an electrochromic module used by a 3D image display device in accordance with a fifth preferred embodiment of the present invention.
Figure 22:
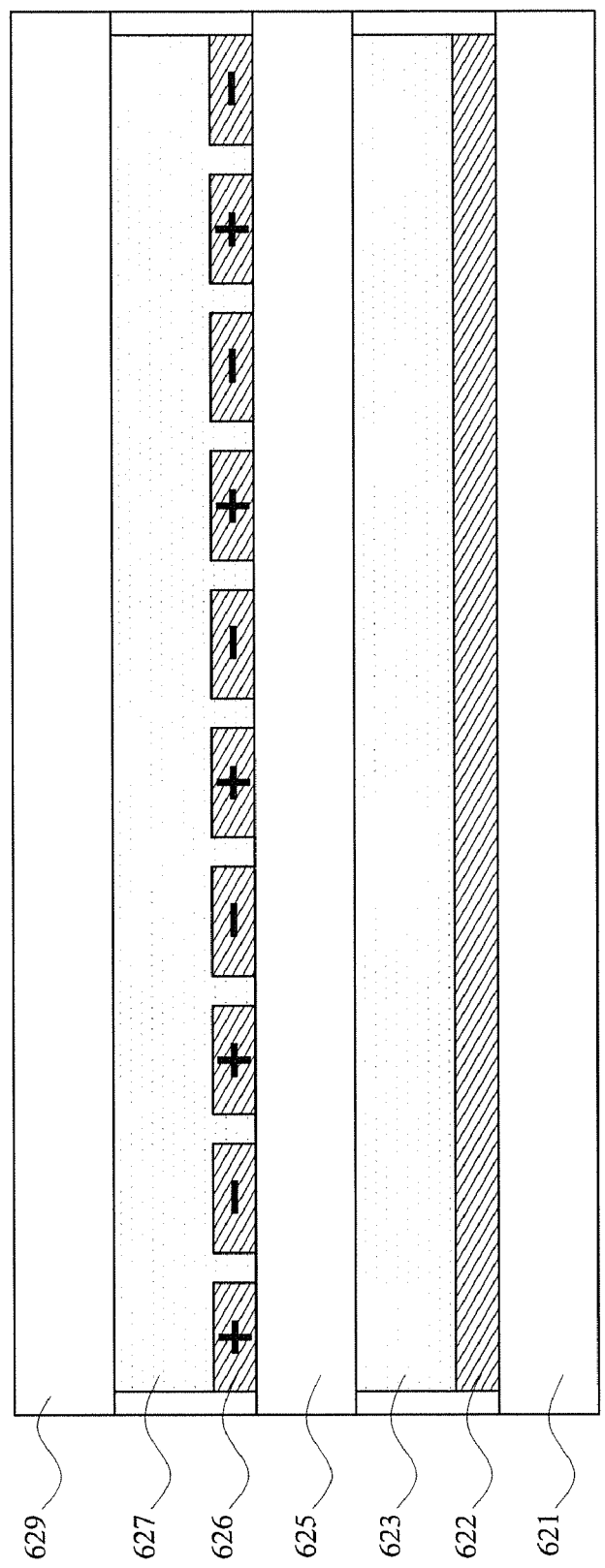
FIG. 22 is a cross-sectional view of an electrochromic module used by a 3D image display device in accordance with a fifth preferred embodiment of the present invention.
Figure 23A:
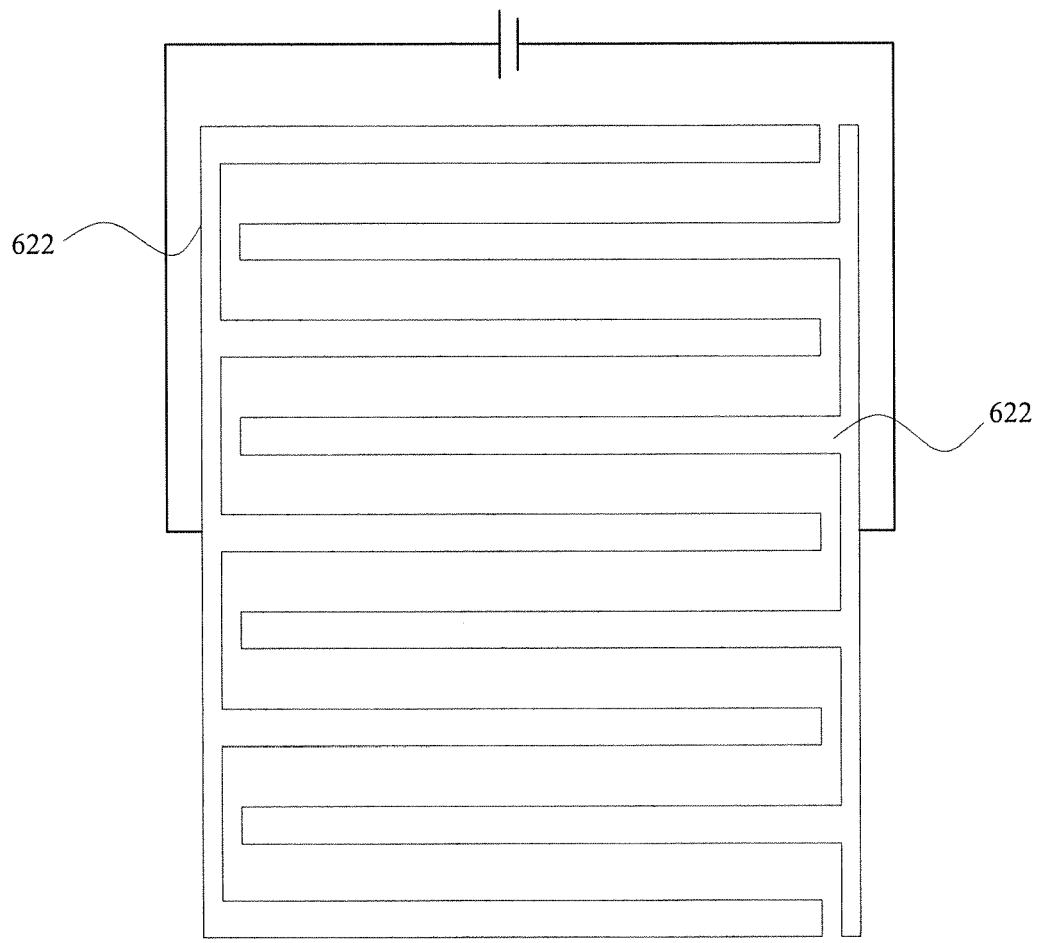
FIG. 23A is a first schematic view of a fifth transparent conductive unit of a 3D image display device in accordance with a fifth preferred embodiment of the present invention.
Figure 23B:
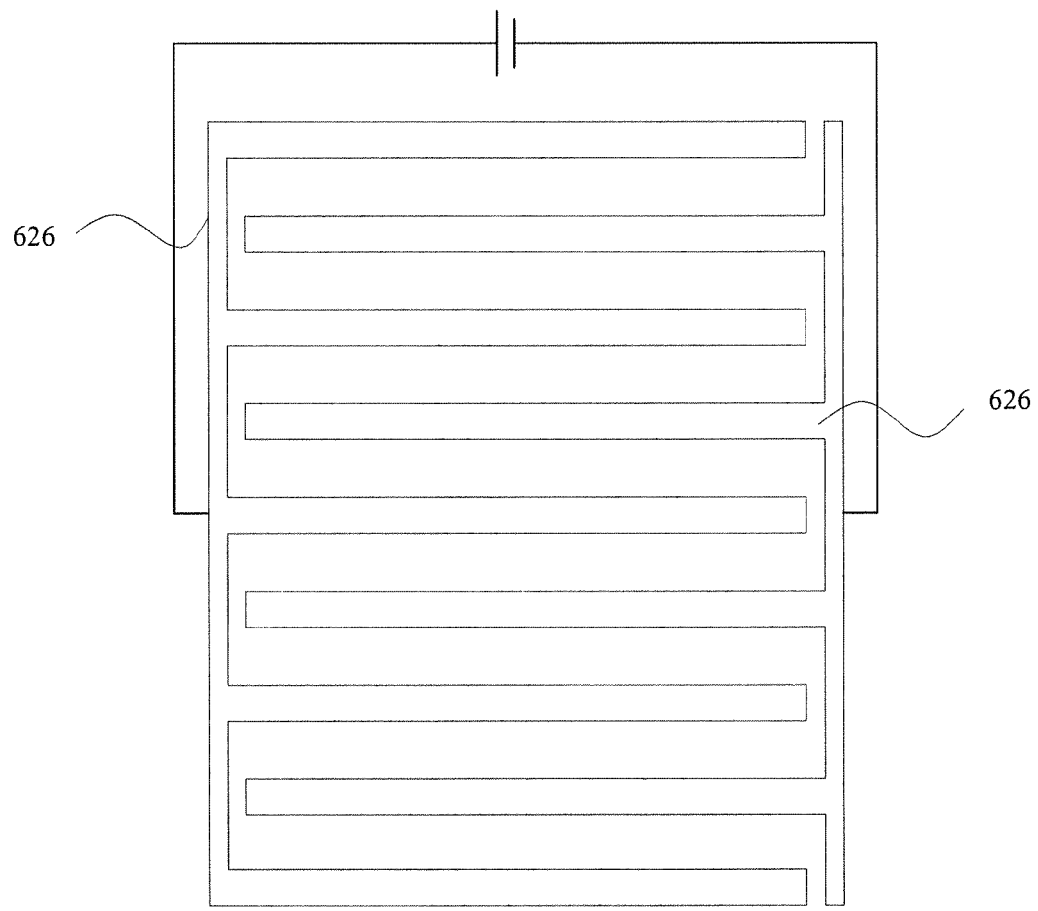
FIG. 23B is a first schematic view of a sixth transparent conductive unit of a 3D image display device in accordance with a fifth preferred embodiment of the present invention.
Figure 24A:
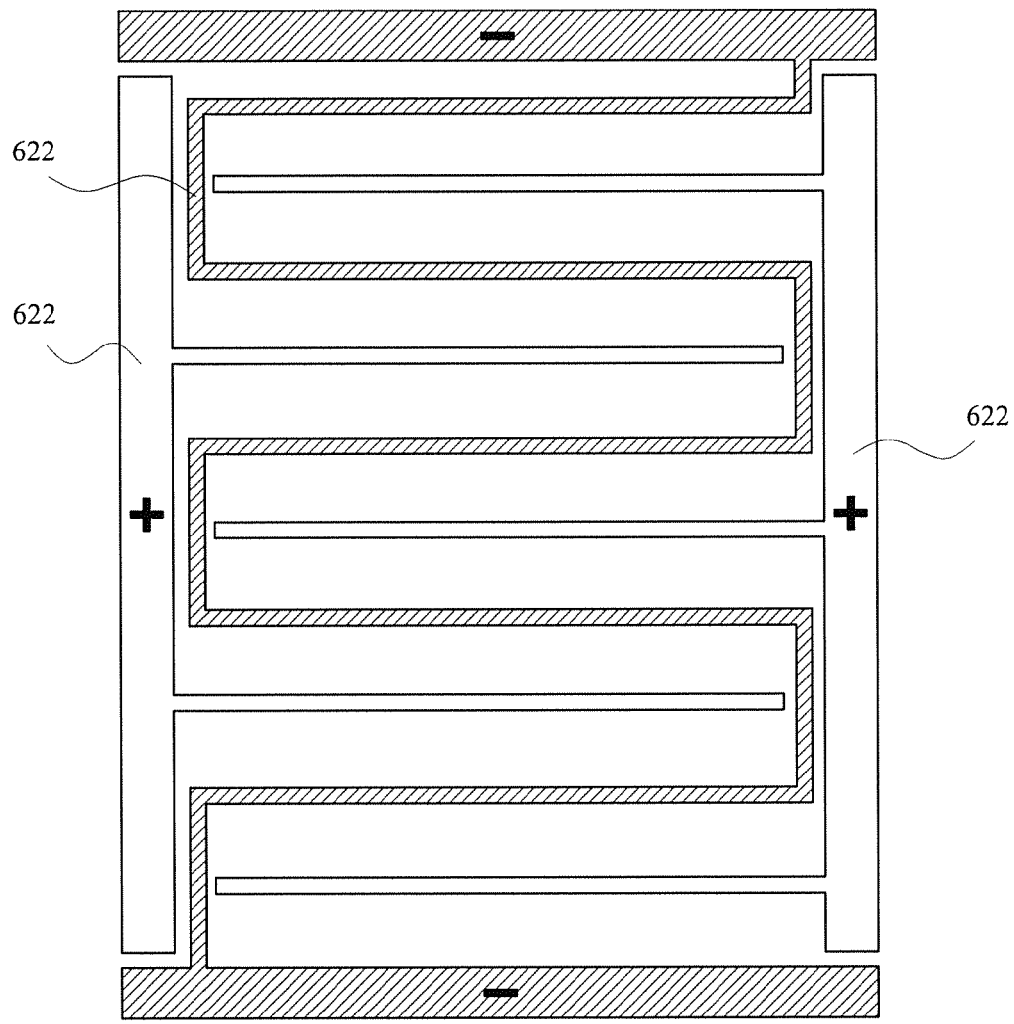
FIG. 24A is a second schematic view of a fifth transparent conductive unit of a 3D image display device in accordance with a fifth preferred embodiment of the present invention.
Figure 24B:
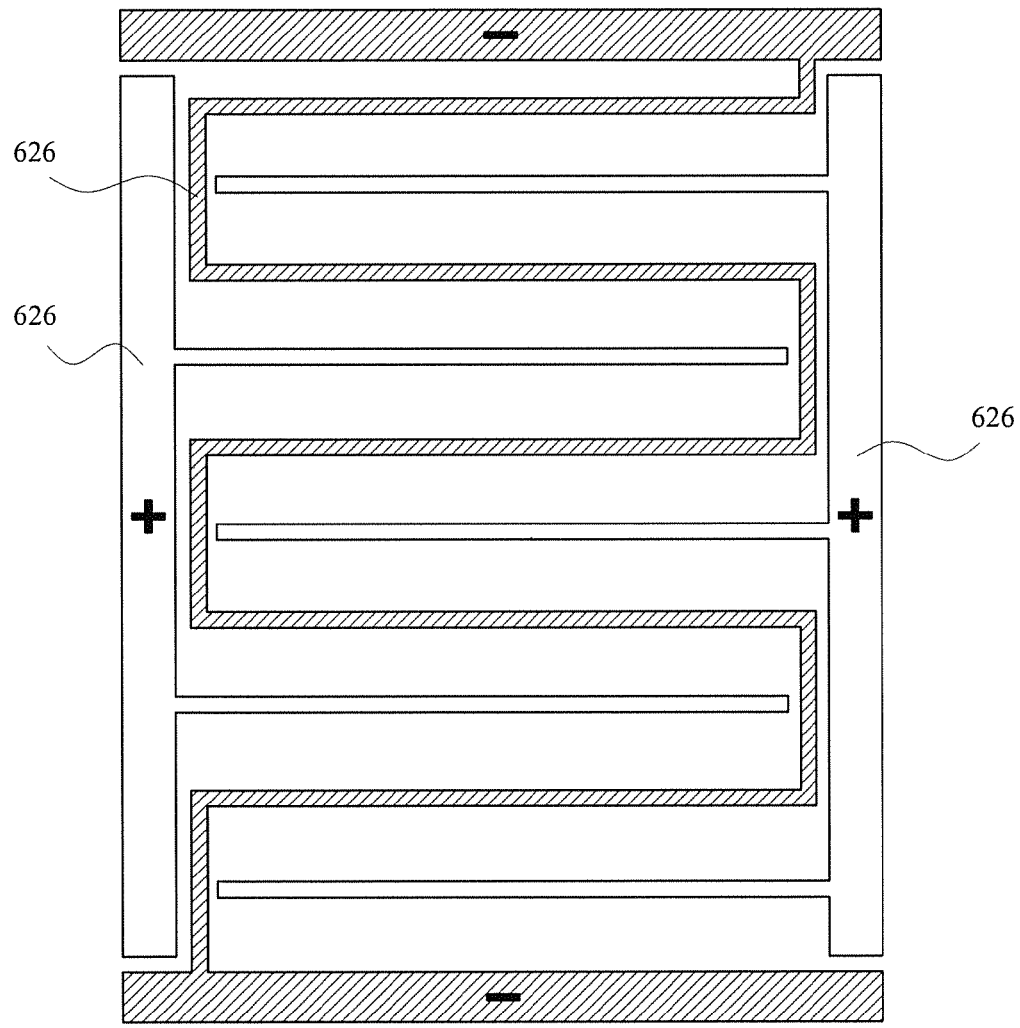
FIG. 24B is a second schematic view of a sixth transparent conductive unit of a 3D image display device in accordance with a fifth preferred embodiment of the present invention.

With reference to FIGS. 21 and 22 for an exploded view and a cross-sectional view of an electrochromic module used by a 3D image display device in accordance with a fifth preferred embodiment of the present invention respectively, this preferred embodiment of the present invention has the transparent conductive unit on one of the substrates of the electrochromic module only. For example, the first transparent substrate 621 has a plurality of fifth transparent conductive units 622 disposed with an interval apart from each other, and the second transparent substrate 625 has a plurality of sixth transparent conductive units 626 disposed with an interval apart from each other, and the fifth transparent conductive units 622 and the sixth transparent conductive units 626 are arranged in the same direction, preferably arranged orthogonally, and the first electrochromic element 623 is disposed between the first transparent substrate 621 and the second transparent substrate 625, and the second electrochromic element 627 is disposed between the second transparent substrate 625 and a third transparent substrate 629. The fifth and sixth transparent conductive units 622, 626 have electrodes designed in a way as shown in FIGS. 23A and 23B, and provided for alternately supplying positive and negative voltages, or as shown in FIGS. 24A and 24B, the transparent conductive units with a negative voltage are arranged in a S-shape, and with the transparent conductive units with a positive voltage are disposed alternately between the anodes and covered by the transparent conductive unit with an anode, and such design can overcome the electric field effect and avoid the cross talk phenomenon, such that the coloration of the electrochromic element can be uniform.

Figure 25:
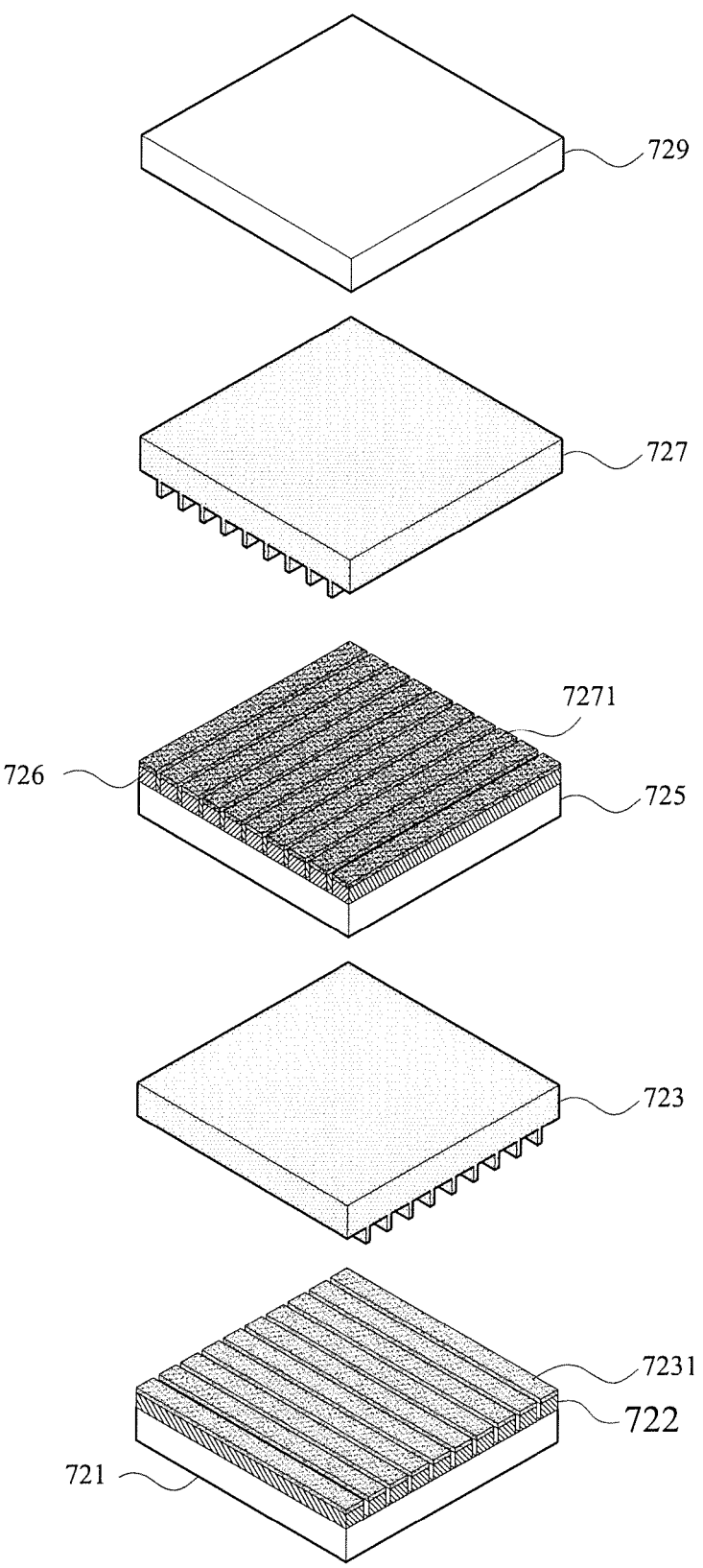
FIG. 25 is an exploded view of an electrochromic module used by a 3D image display device in accordance with a sixth preferred embodiment of the present invention.
Figure 26:
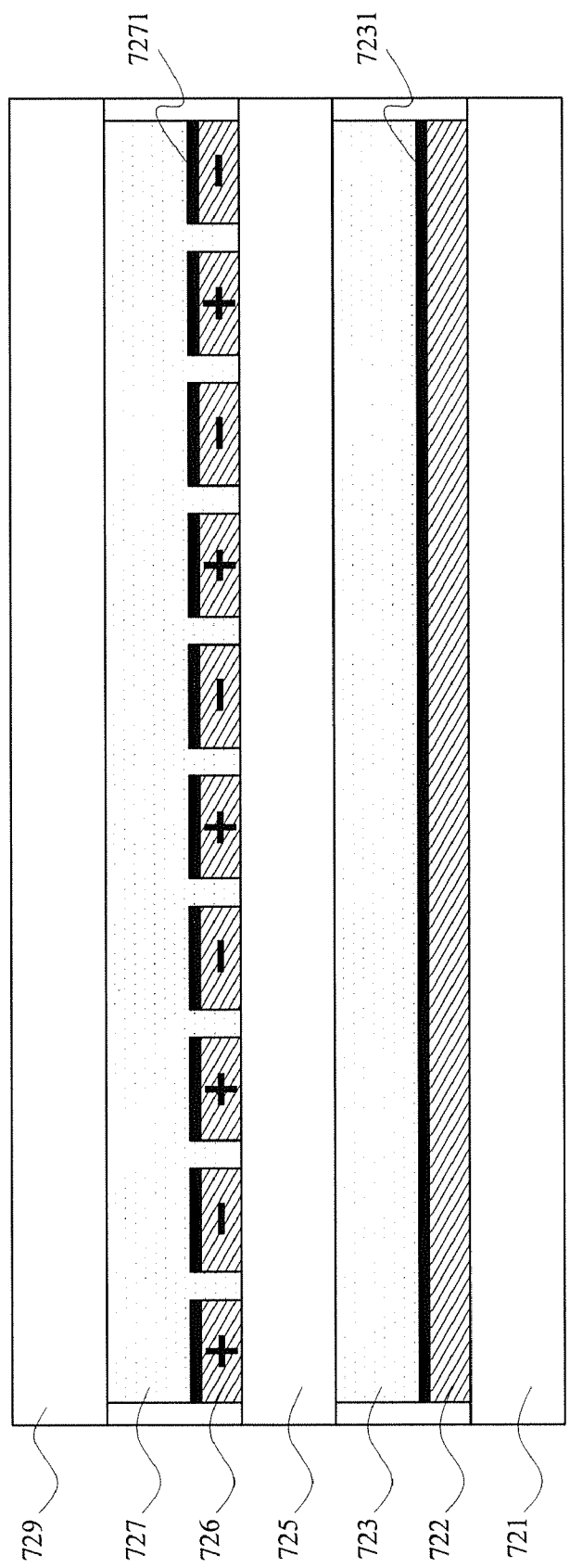
FIG. 26 is a cross-sectional view of an electrochromic module used by a 3D image display device in accordance with a sixth preferred embodiment of the present invention.

With reference to FIGS. 25 and 26 for an exploded view and a cross-sectional view of an electrochromic module used by a 3D image display device in accordance with a sixth preferred embodiment of the present invention respectively, the arrangement and structure of the first transparent substrate 721, the fifth transparent conductive unit 722, the first electrochromic element 723, the second transparent substrate 725, the second transparent conductive unit 726, the second electrochromic element 727, the sixth transparent conductive unit and the third transparent substrate 729 are the same as the fifth preferred embodiment, except that the transparent conductive units 722, 726 further include a plurality of first and second masking units 7231, 7271 on surfaces of the transparent conductive units 722, 726 for sheltering upper surfaces of the transparent conductive units 722, 726, such that the coloration of the electrochromic elements 723, 727 is limited to the area between the anode and the cathode of the transparent conductive units 722, 726.

Figure 27:
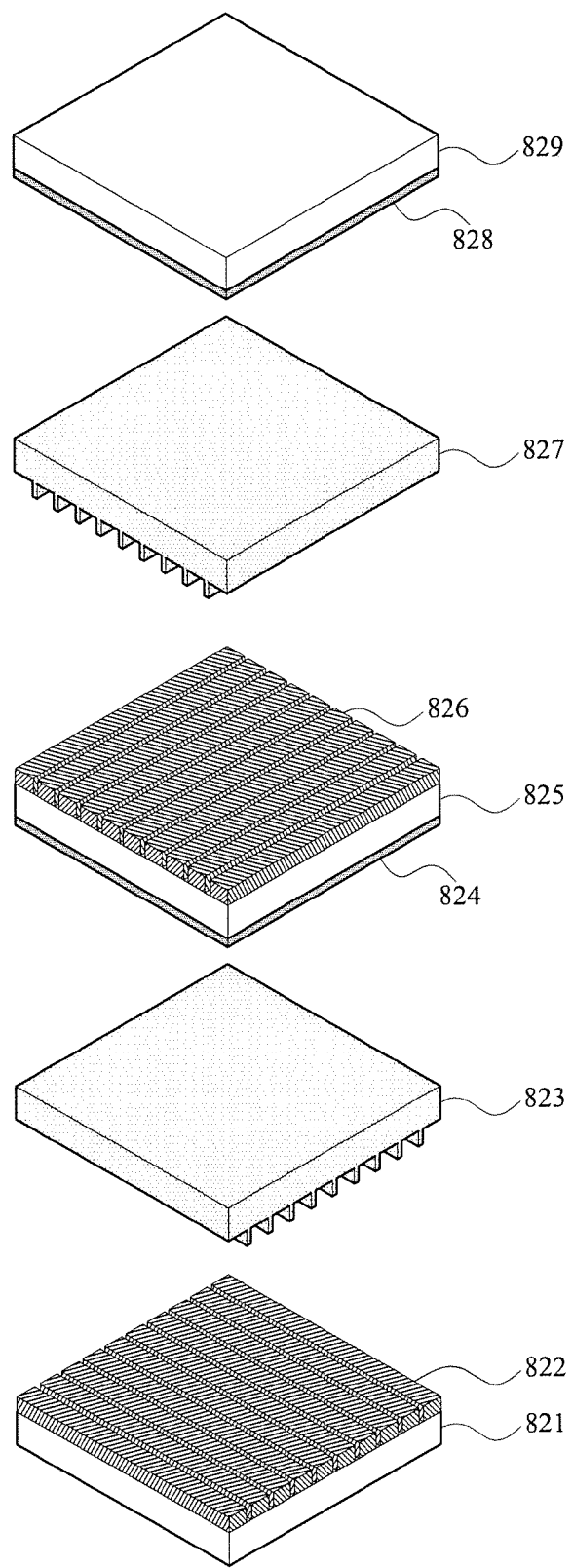
FIG. 27 is an exploded view of an electrochromic module used by a 3D image display device in accordance with a seventh preferred embodiment of the present invention.
Figure 28:
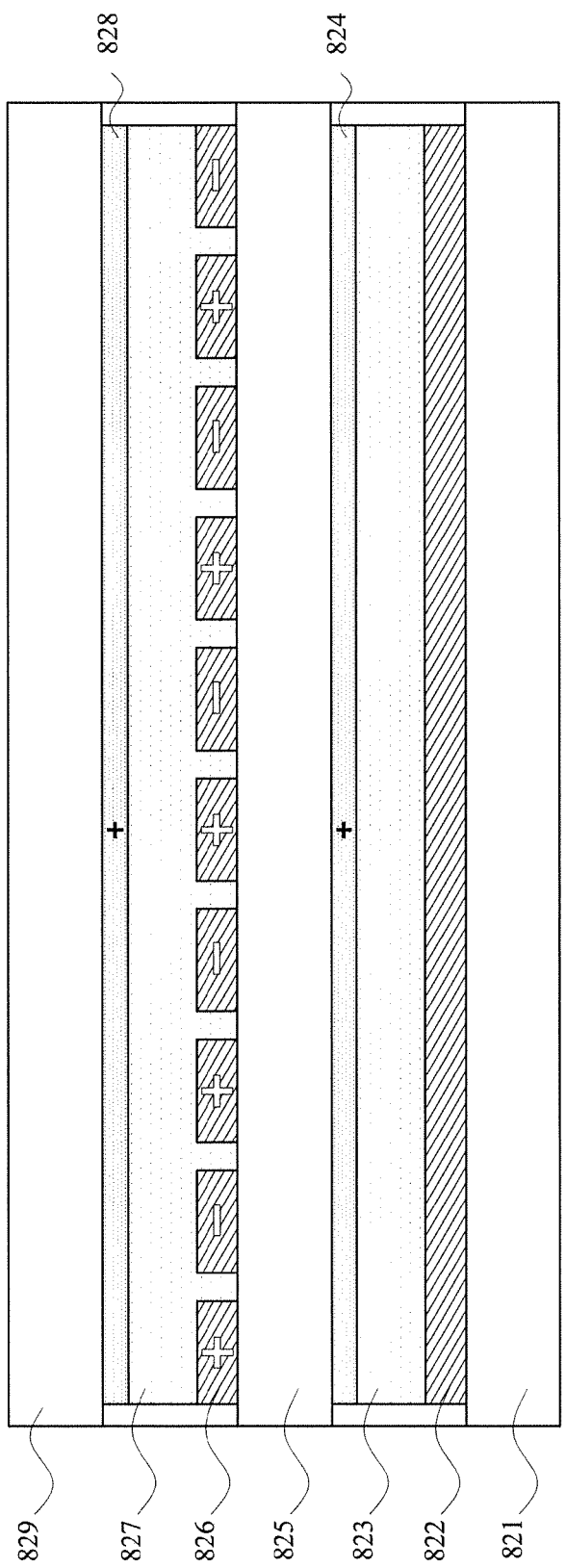
FIG. 28 is a cross-sectional view of an electrochromic module used by a 3D image display device in accordance with a seventh preferred embodiment of the present invention.

With reference to FIGS. 27 and 28 for an exploded view and a cross-sectional view of an electrochromic module used by a 3D image display device in accordance with a seventh preferred embodiment of the present invention respectively, the arrangement and structure of the first transparent substrate 821, the first transparent conductive unit 822, the first electrochromic element 823, the second transparent substrate 825, the second electrochromic element 827 and the third transparent substrate 829 are the same as those of the aforementioned preferred embodiments, except that the second and third transparent substrates further include at least one seventh and eighth transparent conductive units 824, 828 on lower surfaces of the second and third transparent substrates to avoid crosstalks between the images, and positive and negative voltages are applied alternately to the fifth and sixth transparent conductive units 822, 826, and the seventh and eighth transparent conductive units 824, 828 only supply a positive voltage to the first electrochromic element 823 and the second electrochromic element 827 to limit the coloration area of the electrochromic element on the surface or periphery of the anode.

Figure 29:
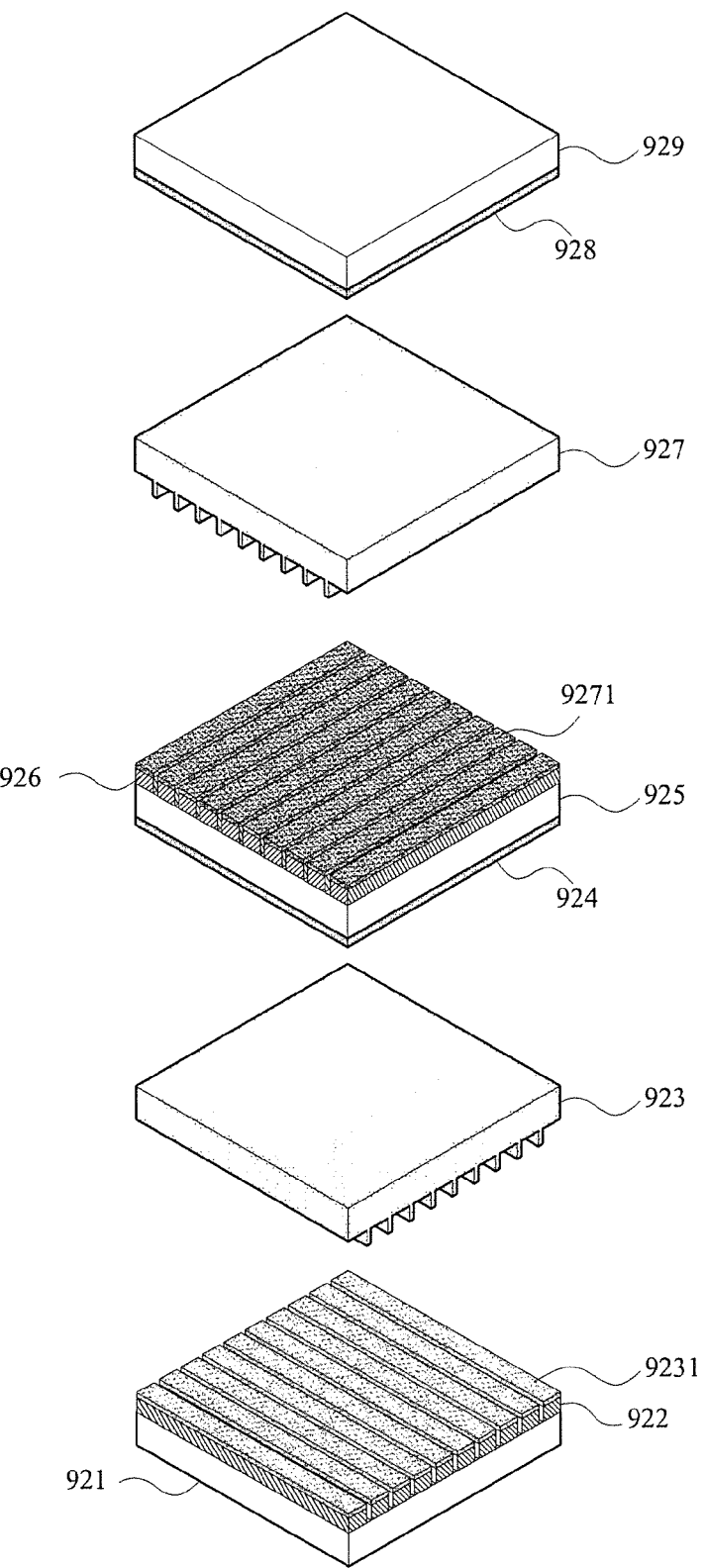
FIG. 29 is an exploded view of an electrochromic module used by a 3D image display device in accordance with an eighth preferred embodiment of the present invention.
Figure 30:
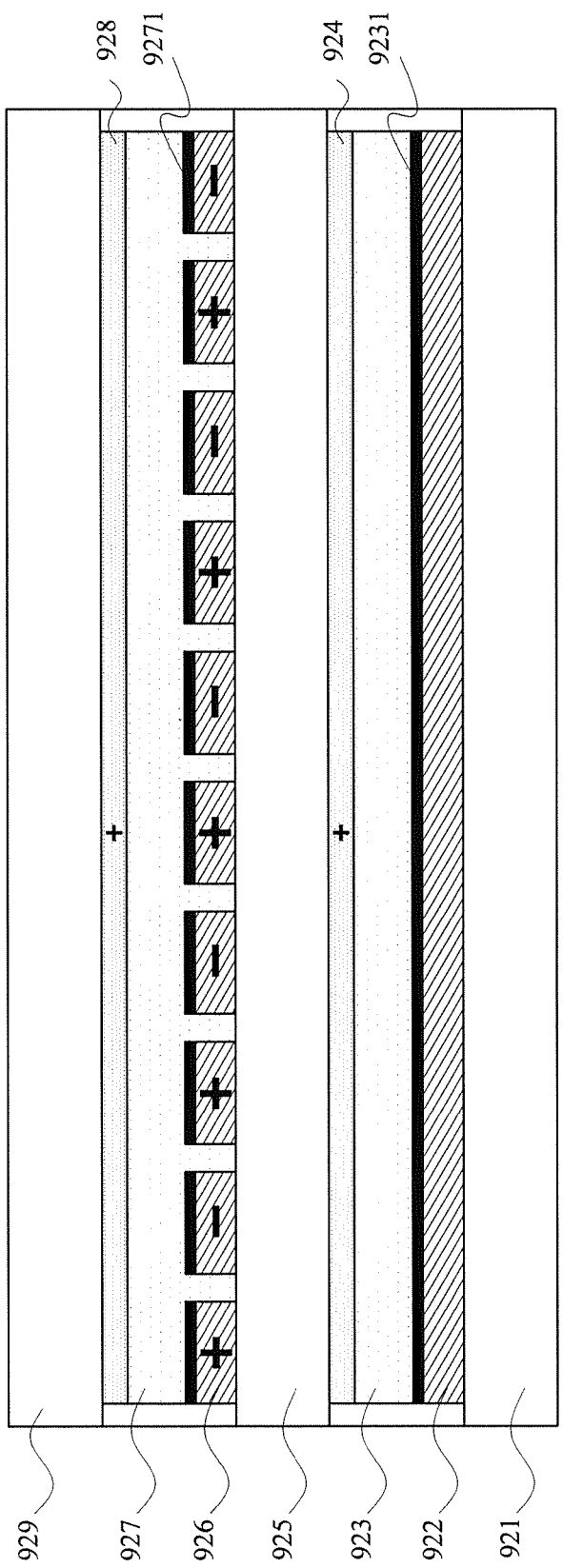
FIG. 30 is a cross-sectional view of an electrochromic module used by a 3D image display device in accordance with an eighth preferred embodiment of the present invention.

With reference to FIGS. 29 and 30 for an exploded view and a cross-sectional view of an electrochromic module used by a 3D image display device in accordance with an eighth preferred embodiment of the present invention respectively, the arrangement and structure of the first transparent substrate 921, the first transparent conductive unit 922, the first electrochromic element 923, the second transparent substrate 925, the second electrochromic element 927 and the third transparent substrate 929 are the same as those of the seventh preferred embodiment, except that the transparent conductive units 922, 926 have a plurality of first and second masking units 9231, 9271 on surfaces of the transparent conductive units 922, 926 for sheltering the upper surfaces of the transparent conductive units 922, 926, such that the electrochromic elements 923, 927 are limited to the area between the anode and the cathode of the transparent conductive units 922, 926 during the coloration.

While the invention has been described by means of specific embodiments, numerous modifications and variations could be made thereto by those skilled in the art without departing from the scope and spirit of the invention set forth in the claims.

In summation of the description above, the electrochromic module combined with organic and inorganic materials and the display device combined with the module in accordance with the present invention complies with the patent application requirements, and thus is duly filed for patent application.

What is claimed is:

1. An electrochromic module, comprising:
   a first transparent substrate;
   a first transparent conductive unit, disposed on a side of the first transparent substrate;
   a plurality of first electrochromic elements, disposed on a side of the first transparent conductive unit;
   a second transparent conductive unit, disposed on a side of the first electrochromic elements;
   a second transparent substrate, disposed on a side of the second transparent conductive unit;
   a third transparent conductive unit, disposed on a side of the second transparent substrate;
   a plurality of second electrochromic elements, disposed on a side of the third transparent conductive unit and arranged orthogonally with respect to the first electrochromic elements;
   a fourth transparent conductive unit, disposed on a side of the second electrochromic elements; a third transparent substrate, disposed on a side of the fourth transparent conductive unit;

a plurality of first isolating units, arranged with an interval apart from each other and disposed between the first electrochromic elements; and a plurality of second isolating units, arranged with an interval apart from each other and disposed between the second electrochromic elements, and the first isolating units and the second isolating units are arranged in the same direction of the first electrochromic elements and the second electrochromic elements respectively;

wherein, the first electrochromic elements change the valence of ions of the first electrochromic element to produce a color change by electrons provided by the first transparent conductive unit or the second transparent conductive unit, and the second electrochromic elements change the valence of ions of the second electrochromic element to produce a color change by electrons provided by the third transparent conductive unit or the fourth transparent conductive unit.

2. The electrochromic module of claim 1, wherein the first electrochromic elements and the second electrochromic elements are produced by mixing and dissolving at least one inorganic electrochromic material and at least one organic electrochromic material into a solvent.

3. The electrochromic module of claim 2, wherein the inorganic electrochromic material is an inorganic derivative selected from of an oxide, a sulfide, a chloride and a hydroxide of a transition element.

4. The electrochromic module of claim 3, wherein the transition element is an element selected from the collection of a scandium subgroup (IIIB), a titanium subgroup (IVB), a chromium subgroup (VIB), a manganese subgroup (VIIB), an iron series (VIII), a copper subgroup (IB), a zinc subgroup (IIB) and a platinum series (VIII).

5. The electrochromic module of claim 2, wherein the inorganic electrochromic material is an inorganic derivative including an oxide, a sulfide, a chloride and a hydroxide selected from the collection of a halogen group (VIIA), an oxygen group (VIA), a nitrogen group (VA), a carbon group (IVA), a boron group (IIIA), an alkali earth metal group (IIA) and an alkali metal group (IA).

6. The electrochromic module of claim 2, wherein the inorganic electrochromic material is one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr).

7. The electrochromic module of claim 2, wherein the organic electrochromic material is a redox indicator, a pH indicator or another organic compound.

8. The electrochromic module of claim 7, wherein the redox indicator is one selected from the collection of methylene blue, ($C_{16}H_{18}ClN_3S.3H_2O$), viologen, N-phenyl-o-anthranilic acid ($C_{13}H_{11}NO_2$), sodium diphenylamine sulfonate ($C_{12}H_{10}NNaO_3S$) dichlorophenolindophenol sodium ($C_{12}H_6Cl_2NNaO_2$) and N,N'-diphenylbenzidine ($C_{20}H_{20}N_2$).

9. The electrochromic module of claim 7, wherein the pH indicator is variamine blue B diazonium salt ($C_{13}H_{12}ClN_3O$).

10. The electrochromic module of claim 7, wherein, the organic compound is one selected from the collection of 7,7,8,8-Tetracyanoquinodimethane and ferrocene [$Fe(C_5H_5)_2$].

11. The electrochromic module of claim 2, wherein the solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfolane, 3-methyl sulfone and their mixtures.

12. The electrochromic module of claim 1, wherein the isolating unit is a photoresist or silicon dioxide ($SiO_2$).

13. The electrochromic module of claim 1, wherein the first electrochromic elements and the second electrochromic elements are produced by doping an electrochromic material with an electrolytic material.

14. The electrochromic module of claim 13, wherein the electrochromic material is one selected from the collection of anodic coloration, cathodic coloration and cathodic/anodic coloration transition metal oxide or an organic electrochromic material.

15. The electrochromic module of claim 14, wherein the transition metal oxide is one selected from the collection of nickel hydroxide [$Ni(OH)_2$], tantalum pentoxide ($Ta_2O_5$), ferric ferrocyanide ($Fe[Fe(Cn)_6]_3$), tungsten oxide ($WO_3$), tantalum pentoxide ($Ta_2O_5$), vanadium oxide ($V_2O_2$), niobium oxide ($Nb_2O_3$), and titanium oxide ($TiO_2$).

16. The electrochromic module of claim 14, wherein the organic electrochromic material is a redox compound, a conductive polymer, a polymer metal complex, a coordination complex of a transition metal or a lanthanide element, a metal phthalocyanine and their derivative.

17. The electrochromic module of claim 16, wherein the organic electrochromic material is one selected from the collection of bipyridyls, viologen, polyacetylene, polyaniline, polypyrrole, polythiophene, ferrocene and iron(III) thiocyanate dissolved in a water solution, hexacyanoferrate dissolved in a tetracyanoquino solution and tetrasulfur cyanide dissolved in an acetonitrile solution.

18. The electrochromic module of claim 13, wherein the electrolytic material is one selected from the collection of lithium perchlorate ($LiClO_4$), potassium hydroxide (KOH), sodium hydroxide (NaOH) and sodium silicate ($Na_2SiO_3$).

19. The electrochromic module of claim 1, wherein the first electrochromic elements and the second electrochromic elements further include an electrolytic material or a macromolecular polymer.

20. The electrochromic module of claim 19, wherein the electrolytic material is one selected from the collection of lithium perchlorate ($LiClO_4$), potassium hydroxide (KOH), sodium hydroxide (NaOH) and sodium silicate ($Na_2SiO_3$).

21. The electrochromic module of claim 19, wherein the macromolecular polymer is one selected from the collection of a highly fluorinated resin, poly(2-acrylamido-2-methyl-1-propanesulfonic acid) (PAMAS), poly(vinylalcohol phosphoric acid) (PAVA), polyethylene oxide (PEO), polyethyleneimine (PEI), tetrabutylammonium tetrafluoroborate, polymethylmethacrylate (PMMA), phenyl acid phosphate (PAP), polyvinyl pyrrolidon (PVP) and their mixture.

22. The electrochromic module of claim 1, wherein when the first and second transparent conductive units come with a plural quantity, the first transparent conductive units and the second transparent conductive units are arranged with an interval apart from each other and disposed between the first transparent substrate and the second transparent substrate, such that each first electrochromic element is disposed between the first transparent conductive unit and the second transparent conductive unit, and when the third and fourth transparent conductive units come with a plural quantity, the third transparent conductive units and the fourth transparent conductive units are arranged with an interval apart from each other and disposed between the second transparent substrate and the third transparent substrate, such that each second electrochromic element is disposed between the third transparent conductive unit and the fourth transparent conductive unit.

23. The electrochromic module of claim 1, wherein the first transparent conductive unit includes a plurality of first isolating portions extended upwardly from the first transparent conductive unit, and the second transparent conductive unit includes a plurality of second isolating portions extended downwardly from the second transparent conductive unit, and the third transparent conductive unit includes a plurality of third isolating portions extended upwardly from the third transparent conductive unit, and the fourth transparent conductive unit includes a plurality of fourth isolating portion extended downwardly from the fourth transparent conductive unit.

24. The electrochromic module of claim 1, wherein the first electrochromic elements and the second electrochromic elements further include an inert conductive salt selected from the collection of lithium, sodium, and tetra-alkylamine salts.

25. The electrochromic module of claim 1, wherein the electrochromic module is coupled to a display module, a control unit and a sensing unit to form a 3D image display device, and the control unit is electrically coupled to the first transparent conductive unit, the second transparent conductive unit, the third transparent conductive unit and the fourth transparent conductive unit of the electrochromic module, and electrically coupled to the sensing unit and the display module, such that the sensing unit senses a rotating direction of the display module and transmits a sensing signal to the control unit, and the control unit controls the voltage of the first transparent conductive unit, the second transparent conductive unit, the third transparent conductive unit and the fourth transparent conductive unit, such that the first electrochromic elements or the second electrochromic elements have a coloration to form a parallax barrier.

26. The electrochromic module of claim 25, wherein the sensing unit is a gyroscope or an optoelectronic direction sensor.

27. An electrochromic module, comprising:
a first transparent substrate;
a plurality of fifth transparent conductive units, arranged with an interval apart from each other and disposed on a side of the first transparent substrate;
a first electrochromic element, deposed on a side of the fifth transparent conductive unit;
a second transparent substrate, deposed on a side of the first electrochromic element;
a plurality of sixth transparent conductive units, arranged with an interval apart from each other and deposed on a side of the second transparent substrate;
a second electrochromic element, deposed on a side of the sixth transparent conductive unit; and
a third transparent substrate, deposed on a side of the second electrochromic element;
wherein the fifth transparent conductive unit and the sixth transparent conductive unit are arranged orthogonally with each other, and the valence of ions of the first electrochromic element being changed for a coloration by the electrons provided by the fifth transparent conductive unit, and the valence of ions of the second electrochromic elements being changed for a coloration by the electrons provided by the sixth transparent conductive unit.

28. The electrochromic module of claim 27, wherein the fifth transparent conductive unit alternately supplies positive and negative voltages to the first electrochromic element, and the sixth transparent conductive unit alternately supplies positive and negative voltages to the second electrochromic element.

29. The electrochromic module of claim 28, further comprising at least one seventh transparent conductive unit and an eighth transparent conductive unit, and the seventh transparent conductive unit being disposed on a lower surface of the second transparent substrate, and the eighth transparent conductive unit being disposed on a lower surface of the third transparent substrate.

30. The electrochromic module of claim 29, wherein the seventh and eighth transparent conductive units supply a positive voltage to the first electrochromic element and the second electrochromic element.

31. The electrochromic module of claim 27, further comprising a plurality of first and second masking units disposed on upper surfaces of the fifth and sixth transparent conductive units.

32. The electrochromic module of claim 31, wherein the first and second masking units are photoresist or silicon dioxide.

33. The electrochromic module of claim 27, wherein the first electrochromic elements and the second electrochromic elements are produced by mixing and dissolving an inorganic electrochromic material and an organic electrochromic material into a solvent.

34. The electrochromic module of claim 33, wherein the inorganic electrochromic material is an in organic derivative selected from an oxide, a sulfide, a chloride and a hydroxide of a transition element.

35. The electrochromic module of claim 34, wherein the transition element is an element selected from the collection of a scandium subgroup (IIIB), a titanium subgroup (IVB), a chromium subgroup (VIB), a manganese subgroup (VIIB), an iron series (VIII), a copper subgroup (IB), a zinc subgroup (IIB) and a platinum series (VIII).

36. The electrochromic module of claim 33, wherein the inorganic electrochromic material is an inorganic derivative including an oxide, a sulfide, a chloride and a hydroxide selected from the collection of a halogen group (VIIA), an oxygen group (VIA), a nitrogen group (VA), a carbon group (IVA), a boron group (IIIA), an alkali earth metal group (IIA) and an alkali metal group (IA).

37. The electrochromic module of claim 33, wherein the inorganic electrochromic material is one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr).

38. The electrochromic module of claim 33, wherein the organic electrochromic material is a redox indicator, a pH indicator or another organic compound.

39. The electrochromic module of claim 38, wherein the redox indicator is one selected from the collection of methylene blue, ($C_{16}H_{18}ClN_3S.3H_2O$), viologen, N-phenyl-o-anthranilic acid ($C_{13}H_{11}NO_2$), sodium diphenylamine sulfonate ($C_{12}H_{10}NNaO_3S$) dichlorophenolindophenol sodium ($C_{12}H_6Cl_2NNaO_2$) and N,N'-diphenylbenzidine ($C_{20}H_{20}N_2$).

40. The electrochromic module of claim 38, wherein the pH indicator is a variamine blue B diazonium salt ($C_{13}H_{12}ClN_3O$).

41. The electrochromic module of claim 38, wherein the organic compound is one selected from the collection of 7,7,8,8-Tetracyanoquinodimethane and ferrocene [$Fe(C_5H_5)_2$].

42. The electrochromic module of claim 33, wherein the solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfon, 3-methyl sulfone and their mixtures.

43. The electrochromic module of claim 27, wherein the first electrochromic elements and the second electrochromic elements are made by doping an electrochromic material with an electrolytic material.

44. The electrochromic module of claim 43, wherein the electrochromic material is a transition metal oxide selected from the collection of an anodic coloration group, a cathodic coloration group, a cathodic/anodic coloration group, and an organic electrochromic material.

45. The electrochromic module of claim 44, wherein the transition metal oxide is one selected from the collection of nickel hydroxide [$Ni(OH)_2$], tantalum pentoxide ($Ta_2O_5$), ferric ferrocyanide ($Fe[Fe(Cn)_6]_3$), tungsten oxide ($WO_3$), tantalum pentoxide ($Ta_2O_5$), vanadium oxide ($V_2O_2$), niobium oxide ($Nb_2O_3$), and titanium oxide ($TiO_2$).

46. The electrochromic module of claim 44, wherein the organic electrochromic material is a redox compound, a conductive polymer, a polymer metal complex, a coordination complex of a transition metal or a lanthanide element, a metal phthalocyanine and their derivative.

47. The electrochromic module of claim 46, wherein the organic electrochromic material is one selected from the collection of bipyridyls, viologen, polyacetylene, polyaniline, polypyrrole, polythiophene, ferrocene and iron(III) thiocyanate dissolved in a water solution, hexacyanoferrate dissolved in a tetracyanoquino solution and tetrasulfur cyanide dissolved in an acetonitrile solution.

48. The electrochromic module of claim 44, wherein the electrolytic material is one selected from the collection of lithium perchlorate ($LiClO_4$), potassium hydroxide (KOH), sodium hydroxide (NaOH) and sodium silicate ($Na_2SiO_3$).

49. The electrochromic module of claim 27, wherein the first electrochromic element and the second electrochromic element further comprise an electrolytic material or a macromolecular polymer.

50. The electrochromic module of claim 49, wherein the electrolytic material is one selected from the collection of lithium perchlorate ($LiClO_4$), potassium hydroxide (KOH), sodium hydroxide (NaOH) and sodium silicate ($Na_2SiO_3$).

51. The electrochromic module of claim 49, wherein the macromolecular polymer is one selected from the collection of a highly fluorinated resin, poly(2-acrylamido-2-methyl-1-propanesulfonic acid) (PAMAS), poly(vinylalcohol phosphoric acid) (PAVA), polyethylene oxide (PEO), polyethyleneimine (PEI), tetrabutylammonium tetrafluoroborate, polymethylmethacrylate (PMMA), phenyl acid phosphate (PAP), polyvinyl pyrrolidon (PVP) and their mixture.

52. The electrochromic module of claim 27, wherein the electrochromic module is coupled to a display module, a control unit and a sensing unit to form a 3D image display device, and the control unit is electrically coupled to the fifth transparent conductive unit and the sixth transparent conductive unit of the electrochromic module and electrically coupled to the sensing unit and the display module, and the sensing unit is provided for sensing a rotating direction of the display module, and a sensing signal is transmitted to the control unit, and the voltage of the fifth transparent conductive unit and the sixth transparent conductive unit is controlled by the control unit, such that the first electrochromic elements or the second electrochromic elements change colors to form a parallax barrier.

53. The electrochromic module device of claim 52, wherein the sensing unit is a gyroscope or an optoelectronic direction sensor.

* * * * *